(12) United States Patent
Bakthavatchalam et al.

(10) Patent No.: US 11,882,142 B2
(45) Date of Patent: Jan. 23, 2024

(54) NETWORK TRAFFIC CLASSIFICATION SYSTEM

(71) Applicant: Redberry Systems, Inc., Los Altos Hills, CA (US)

(72) Inventors: Madhavan Bakthavatchalam, Fremont, CA (US); Sandeep Khanna, Los Altos, CA (US); Varadarajan Srinivasan, Lost Altos Hills, CA (US)

(73) Assignee: Redberry Systems, Inc., Los Altos Hills, CA (US)

( * ) Notice: Subject to any disclaimer, the term of this patent is extended or adjusted under 35 U.S.C. 154(b) by 0 days.

(21) Appl. No.: 18/235,762

(22) Filed: Aug. 18, 2023

(65) Prior Publication Data

US 2023/0396636 A1 Dec. 7, 2023

Related U.S. Application Data

(63) Continuation of application No. 16/572,581, filed on Sep. 16, 2019, now Pat. No. 11,770,391.

(51) Int. Cl.
*H04L 9/40* (2022.01)
*G06N 5/04* (2023.01)
*G06N 20/00* (2019.01)

(52) U.S. Cl.
CPC .......... *H04L 63/1425* (2013.01); *G06N 5/04* (2013.01); *G06N 20/00* (2019.01); *H04L 63/1416* (2013.01)

(58) Field of Classification Search
CPC ... H04L 63/1425; H04L 63/1416; G06N 5/04; G06N 20/00
See application file for complete search history.

(56) References Cited

U.S. PATENT DOCUMENTS

| | | |
|---|---|---|
| 10,579,937 B2 | 3/2020 | Brand et al. |
| 10,673,880 B1 | 6/2020 | Pratt et al. |
| 10,728,119 B2 | 7/2020 | Parandehgheibi et al. |
| 11,010,472 B1 | 5/2021 | Powers et al. |
| 11,210,397 B1 | 12/2021 | Sharif et al. |
| 11,228,614 B1 | 1/2022 | Clark et al. |

(Continued)

FOREIGN PATENT DOCUMENTS

EP 599566 A1 1/2020

OTHER PUBLICATIONS

Elovici et al., "Applying Machine Learning Techniques for Detection of Malicious Code in Network Traffic," J. Hertzberg, M. Beetz, and R. Englert (Eds.): KI2007, LNAI 4667, pp. 44-50, Springer-Verlag Berlin Heidelberg 2007.

(Continued)

*Primary Examiner* — Joseph P Hirl
*Assistant Examiner* — Thomas A Gyorfi
(74) *Attorney, Agent, or Firm* — Paradice & Li LLP

(57) ABSTRACT

This disclosure provides systems, methods and apparatuses for classifying traffic flow using a plurality of learning machines arranged in multiple hierarchical levels. A first learning machine may classify a first portion of the input stream as malicious based on a match with first classification rules, and a second learning machine may classify at least part of the first portion of the input stream as malicious based on a match with second classification rules. The at least part of the first portion of the input stream may be classified as malicious based on the matches in the first and second learning machines.

30 Claims, 14 Drawing Sheets

(56) References Cited

U.S. PATENT DOCUMENTS

| | | |
|---|---|---|
| 11,528,296 B2 * | 12/2022 | Ramasamy ......... H04L 63/1466 |
| 2019/0294792 A1 | 9/2019 | Singh et al. |
| 2020/0076835 A1 * | 3/2020 | Ladnai .................. G06N 5/022 |
| 2020/0159916 A1 | 5/2020 | Nguyen et al. |
| 2020/0372403 A1 * | 11/2020 | Kursun .................. H04L 41/16 |
| 2021/0042411 A1 | 2/2021 | Annen et al. |
| 2021/0044603 A1 | 2/2021 | Annen et al. |
| 2022/0078575 A1 | 3/2022 | Raveendran et al. |

OTHER PUBLICATIONS

Hastie et al., "The Elements of Statistical Learning Data Mining, Inference, and Prediction," Second Edition, Springer Series in Statistics, Corrected 12th printing, Jan. 13, 2017, 56 pages.

James et al., "An Introduction to Statistical Learning with Applications in R," Springer Texts in Statistics, Springer Science+Business Media, New York, 2013, Chapter 5 introduction (p. 177), sections 5.1 and 5.2 (pp. 178-193), Chapter 8 introduction and sections 8.1 and 8.2 (pp. 307-328), Chapter 10 introduction (p. 373) and section 10.3 Clustering Methods (p. 389-406).

\* cited by examiner

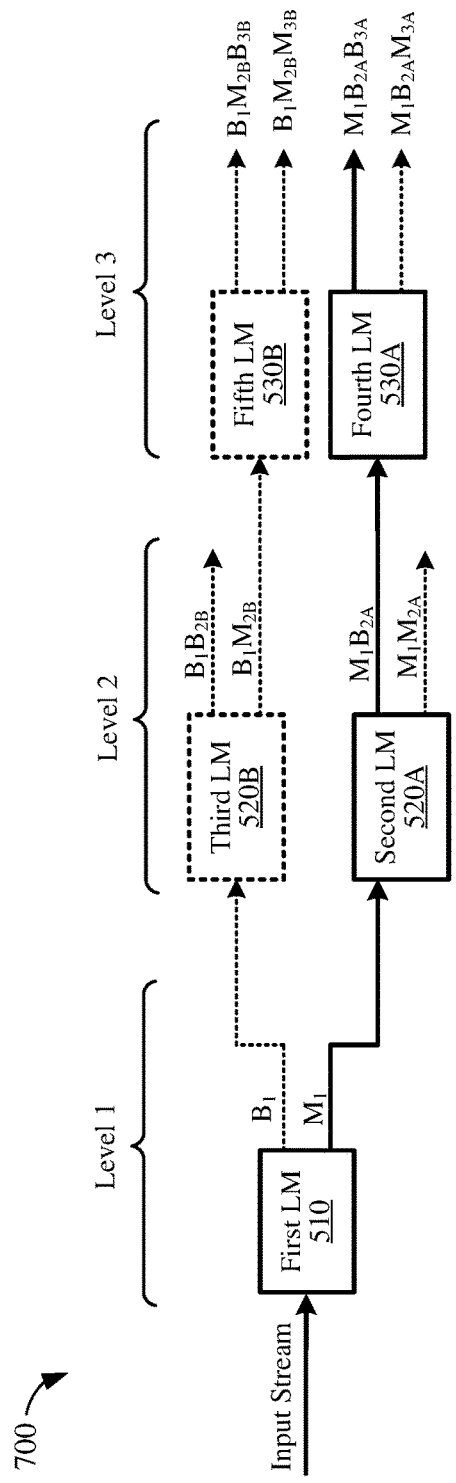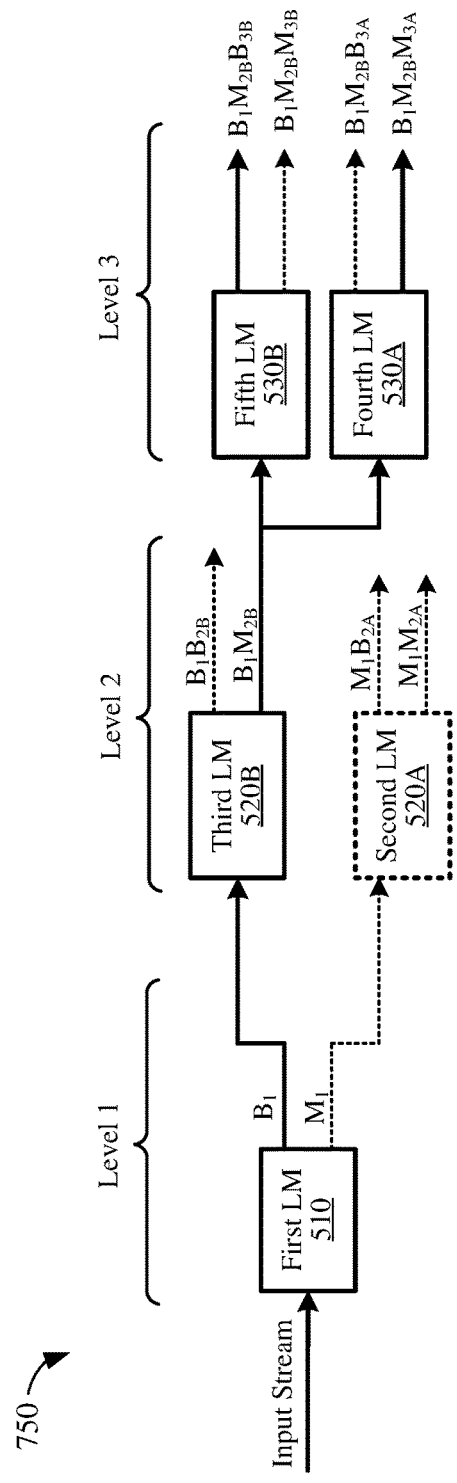
*Figure 7A*
*Figure 7B*

NETWORK TRAFFIC CLASSIFICATION SYSTEM

CROSS-REFERENCE TO RELATED APPLICATION

This patent application is a continuation application claiming priority to U.S. patent application Ser. No. 16/572,581 entitled "NETWORK TRAFFIC CLASSIFICATION SYSTEM" and filed on Sep. 16, 2019, which is assigned to the assignee hereof. The disclosures of all prior applications are considered part of and are incorporated by reference in this patent application.

TECHNICAL FIELD

This disclosure relates generally to network security, and specifically to classifying portions of network traffic as containing malware or as benign.

DESCRIPTION OF THE RELATED TECHNOLOGY

The growth of computer networking has resulted in the proliferation of increasingly sophisticated malicious software attacks typically designed for abusive purposes such as, for example, gathering information, denying or disrupting operations of a computer network, and accessing resources without authorization. These malicious software attacks, which are commonly referred to as malware, may include virus attacks, worm attacks, trojan horse attacks, spyware attacks, adware attacks, botnet attacks, and rootkit attacks. The detection and isolation of malware has traditionally been implemented by software-based solutions that favor tractability over execution speed. However, as network data rates continue to increase, software-only based solutions are increasingly unable to detect malware at line speeds, which may cause malware detection bottlenecks that degrade network performance.

BRIEF DESCRIPTION OF THE DRAWINGS

Details of one or more implementations of the subject matter described in this disclosure are set forth in the accompanying drawings and the description below. Like reference numbers and designations in the various drawings indicate like elements.

FIG. 7A shows an example traffic flow through a learning machine, according to some implementations.

FIG. 7B shows another example traffic flow through a learning machine, according to some implementations.

DETAILED DESCRIPTION

Figure 1:
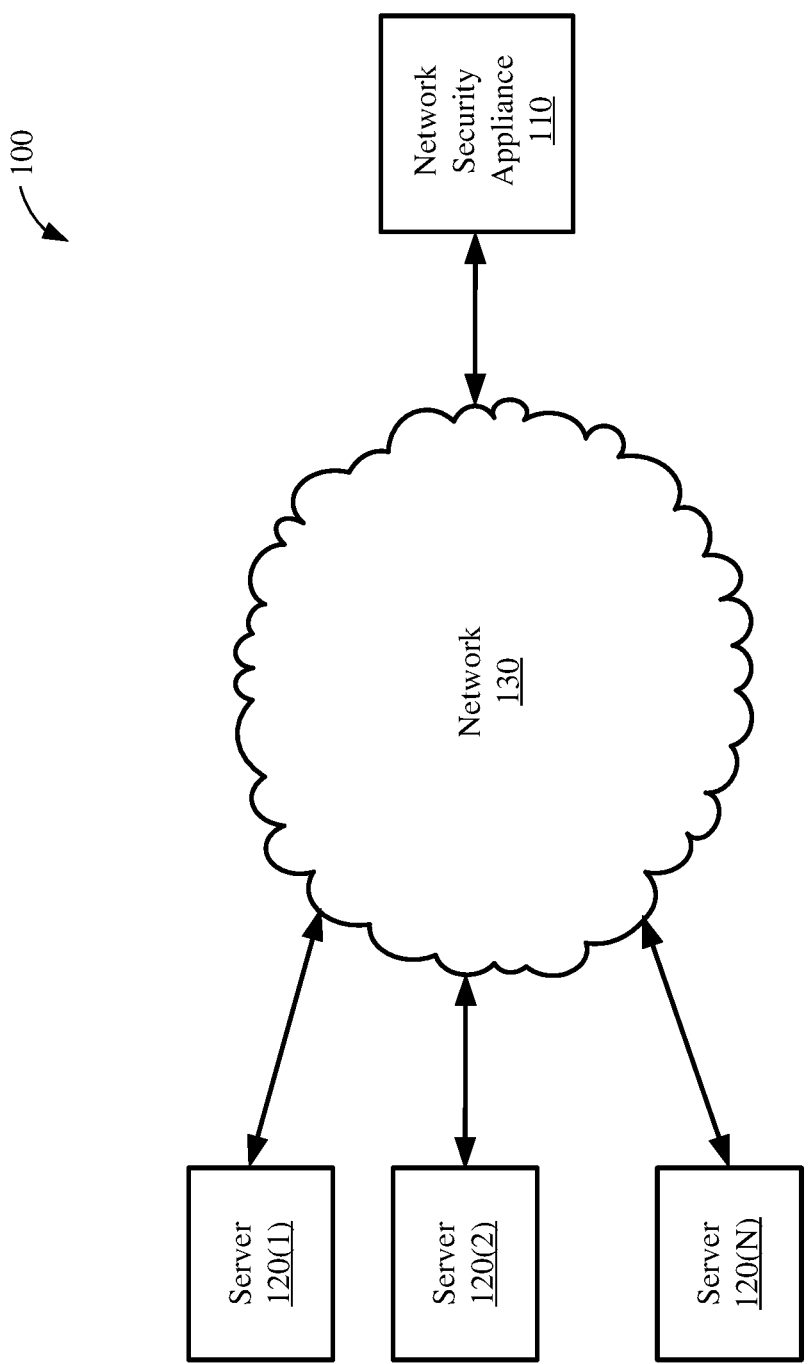
FIG. 1 shows a block diagram of an example environment within which aspects of the present disclosure may be implemented.

The following description is directed to certain implementations for the purposes of describing the innovative aspects of this disclosure. However, a person having ordinary skill in the art will readily recognize that the teachings herein can be applied in a multitude of different ways. The described implementations may be implemented in any computing device, server, system, or network for which it is desirable to detect a presence of malware or other malicious code in a data stream (such as a network traffic flow).

Implementations of the subject matter described in this disclosure may be used in a classification system to determine whether any portions of a data stream contain malware or other malicious code at line speed, and also may be configured to learn or infer updates to existing classification rules and/or new sets of classification rules to detect or identify "new" malware for which no rules or signatures are known or available. The classification system may include a plurality of learning machines that can be individually configured to detect or identify malicious code in a traffic flow based at least in part on one or more sets of classification rules. In some implementations, the learning machines can be independently configured to classify portions of an input stream (such as a traffic flow) as malicious based at least in part on a certain set of classification rules used to identify certain types of malware traffic, and to classify portions of the input stream as benign based at least in part on a separate set of classification rules used to identify benign traffic (i.e., not just as non-malicious). In addition, or in the alternative, certain portions of the input stream may be classified as benign based at least in part on the absence of a match with classification rules that represent malicious traffic. In some aspects, the learning machines may be arranged in a plurality of hierarchical levels that can be individually configured (and/or selected) to classify (i.e., detect or identify) portions of the input stream based on different sets of classification rules. The configuration of the learning machines may be selected or tailored to detect or identify different types of malware, for example, so that the learning machines provided in different hierarchical levels can detect different types or iterations of malware, can use different rules to detect and identify benign traffic, can classify portions of the input stream as malicious or benign, or any combination thereof.

The classification rules used by the systems disclosed herein may include regular expressions (RegExs) configured to detect complex malware that may not be detected using simple strings or binary strings. In some aspects, one or more results from a rules search engine may be provided to the classification system (along with the classification rules). In addition, or in the alternative, the classification rules used by the classification systems disclosed herein may also use features derived from or indicative of one or more characteristics of a particular traffic flow to detect or identify benign traffic or malware and other malicious code embedded within the data stream. In this manner, aspects of the present disclosure may provide robust protection against increasingly complex and nuanced malware and other malicious code in real-time without degrading network performance (such as data throughput rates).

The hierarchical levels within which the learning machines are arranged may also implement a "cross-screening" mechanism, for example, such that input traffic is screened (i.e., scanned) by more than one learning machine and the screening results of all such learning machines are combined to determine a final classification of a certain portion as containing malware or benign traffic. This cross-screening technique can reduce the number or instances in which a classification system may generate false positives and false negatives. As used herein, a false positive is when a classification system classifies a portion of an input stream as malicious when it actually does not contain malware. Similarly, a false negative is when a classification system classifies a portion of an input stream as benign when it actually contains malware. In some implementations, the number of false positives and false negatives generated by the classification system may be reduced by providing portions of the input stream classified as malicious by one learning machine and classified as benign by another learning machine to one or more additional learning machines in one or more subsequent hierarchical levels for further analysis and processing. The ability to minimize (or eliminate) the number of false positives and false negatives may increase the accuracy with which the classification system can identify malware and other malicious code in a traffic stream, and may also improve performance, for example, by increasing the rate at which the classification system can process data associated with an input stream or traffic flow.

The classification systems described herein may also include a programmable flow switch that can dynamically configure or re-configure signal interconnections between any number of the plurality of learning machines to implement a multitude of different learning machine configurations and/or a multitude of different process flows through the various learning machines. The programmable flow switch may use configuration data, classification results generated by one or more of the learning machines, and/or other suitable information when configuring signal interconnections between the learning machines.

FIG. 1 shows a block diagram of an example environment 100 within which aspects of the present disclosure may be implemented. The environment 100 may include a network security appliance 110, a plurality of servers 120(1)-120(N), and a network 130. The servers 120(1)-120(N) may communicate with each other via the network 130. The network 130 may be or include any one or more suitable networks including, for example, a local area network (LAN), a wide area network (WAN), a metropolitan area network (MAN), an optical network, a mesh network, the Internet, or any combination thereof. The network security appliance 110, which may communicate with other systems, servers, and devices via the network 130 (or via other suitable networks or signal connections), may be used to analyze network traffic in real-time to detect the presence of malicious codes such as malware or benign traffic. The network security appliance 110 may include or may be implemented within any suitable device or system including (but not limited to) a router, a network gateway, a server, a mainframe computing device, a computing device, or any other suitable device for which it is desired to determine whether a traffic flow contains malicious code such as malware or benign traffic.

Figure 2:
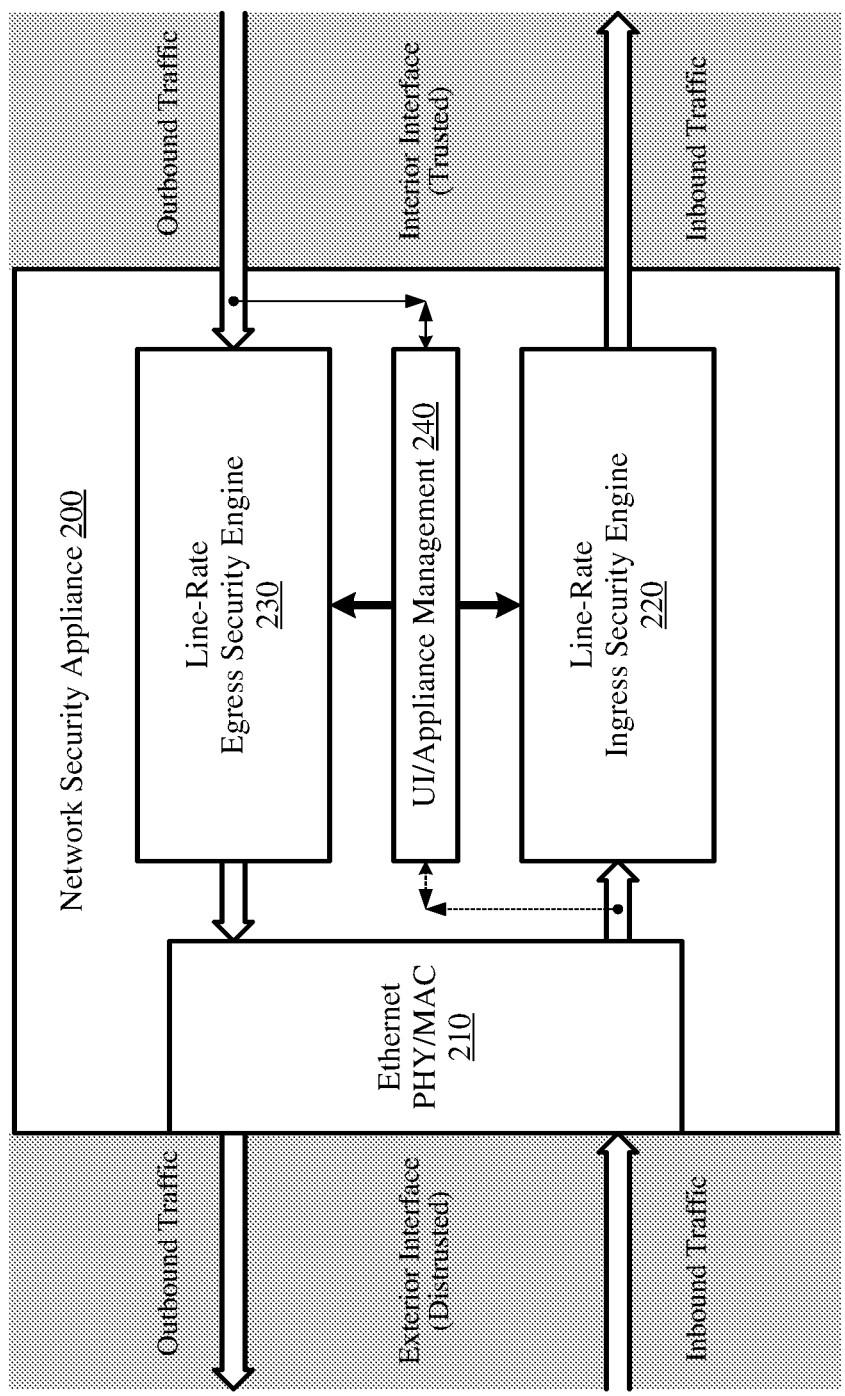
FIG. 2 shows a block diagram of an example network security appliance, according to some implementations.

FIG. 2 shows a block diagram of an example network security appliance 200, according to some implementations. The network security appliance 200, which may be one implementation of the network security appliance 110 of FIG. 1, can execute line-rate classification on packetized network traffic flowing between a distrusted exterior interface and a trusted interior interface. The network security appliance 200 may include an Ethernet interface 210, a line-rate ingress security engine 220, a line-rate egress security engine 230, and a user interface (UI) and appliance management module 240. The Ethernet interface 210 may provide a PHY to MAC layer interface between the exterior interface and the ingress security engine 220 for inbound traffic, and may provide a MAC layer to PHY interface between the exterior interface and the egress security engine 230 for outbound traffic. Although the network security appliance 200 is depicted as having an Ethernet-based exterior interface and a more generalized interior interface, other suitable network interfaces may be used as the exterior interface, the interior interface, or both. In some aspects, the network security appliance 200 may include proprietary interfaces. Further, although the example network security appliance 200 of FIG. 2 is shown to include separate inbound and outbound traffic paths, in other implementations, the network security appliance 200 may include a single bidirectional path for both inbound traffic and outbound traffic.

The ingress security engine 220, which is coupled between the Ethernet interface 210 and the interior interface, may execute security and control operations with respect to traffic ingressing from the exterior network to the interior network (i.e., inbound traffic). The egress security engine 230, which is coupled between the interior interface and the Ethernet interface 210, may execute security and control operations with respect to traffic egressing from the interior network to the exterior network (i.e., outbound traffic). Although security engines 220 and 230 generally implement asymmetric security and control functions (due, for example, to disparate trust in the respective networks from which they receive traffic), both security engines 220 and 230 may carry out the same or similar operations with respect to traffic flows and/or may contain same or similar architectural components. Thus, although various security and control structures and operations are described herein with respect to the ingress security engine 220, such security and control structures and operations are equally applicable to the egress security engine 230. Further, although shown and described herein as separate security engines, in other implementations, the ingress security engine 220 and the egress security engine 230 may be merged into a single security engine that executes security and control operations for both inbound and outbound traffic.

The UI and appliance management module 240 includes inputs coupled to the interior interface and the Ethernet interface 210, and is also coupled to the ingress security engine 220 and the egress security engine 230. The UI and appliance management module 240 may allow a user to provide input for controlling one or more operations, functions, and/or configurations of various devices, engines, and modules within or coupled to the network security appliance 200.

Figure 3:
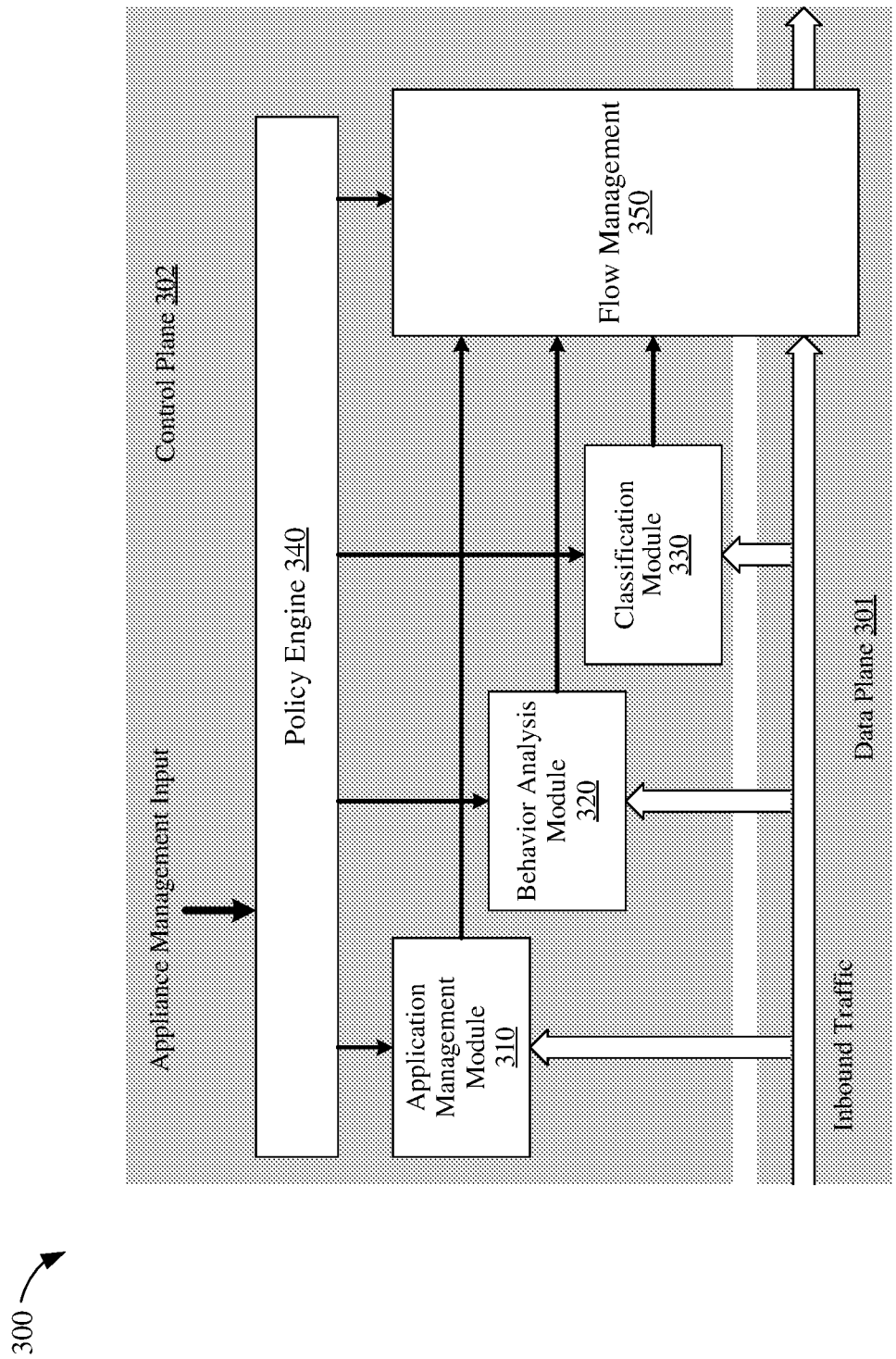
FIG. 3 shows a block diagram of an example ingress security engine, according to some implementations.

FIG. 3 shows a block diagram of an ingress security engine 300, according to some implementations. The ingress security engine 300, which may be one implementation of the ingress security engine 220 of FIG. 2, may be situated with respect to a data plane 301 through which packetized network traffic flows and a control plane 302 that carries out control and management operations with respect to the network traffic. In some implementations, the control plane 302 may include an application management module 310, a behavior analysis module 320, a malware classification module 330, and a policy engine 340. The control plane 302 and the data plane 301 jointly contribute to traffic flow management within a flow management unit 350 and, though not specifically shown, the data plane 301 may additionally include one or more buffers to queue or otherwise store traffic supplied to the application management module 310, the behavior analysis module 320, the classification module 330, and the policy engine 340.

The policy engine 340 may enable application-tailored operation within the ingress security engine 300, for example, by applying input from the UI and appliance management module 240 of FIG. 2 to control various operations of the application management module 310, the behavior analysis module 320, the classification module 330, and the policy engine 340. The input may be received via a dedicated user interface and/or included within traffic from the trusted network (or from the exterior network, with appropriate safeguards). In some implementations, the policy engine 340 may supply (with or without processing) classification rules that include malware signatures or "rules" (such as continuous or disjointed strings of symbols that correspond to known malware implementations), and/or benign signatures or rules (i.e., to classify or specifically identify portions of input traffic as benign and not just non-malicious), to classify, respectively, inbound traffic and report the results to the flow management unit 350.

The flow management unit 350 may take various actions with respect to reported malware detections, including blocking malware-infested traffic flows and/or seizing information with respect to such flows to enable forensic or other advanced security measures. In some implementations, the flow management unit 350 may respond to rule-search results generated by the rule search engine in accordance with various policy controls, for example, by blocking malware-laden traffic flows in some instances and permitting some or all of the traffic flow to pass in other instances. In some aspects, the flow management unit 350 may monitor rule-search results generated by the rule search engine and identify the match-yielding rule in response to detecting a match between a portion of the traffic flow and one or more of the rules or signatures.

Figure 4A:
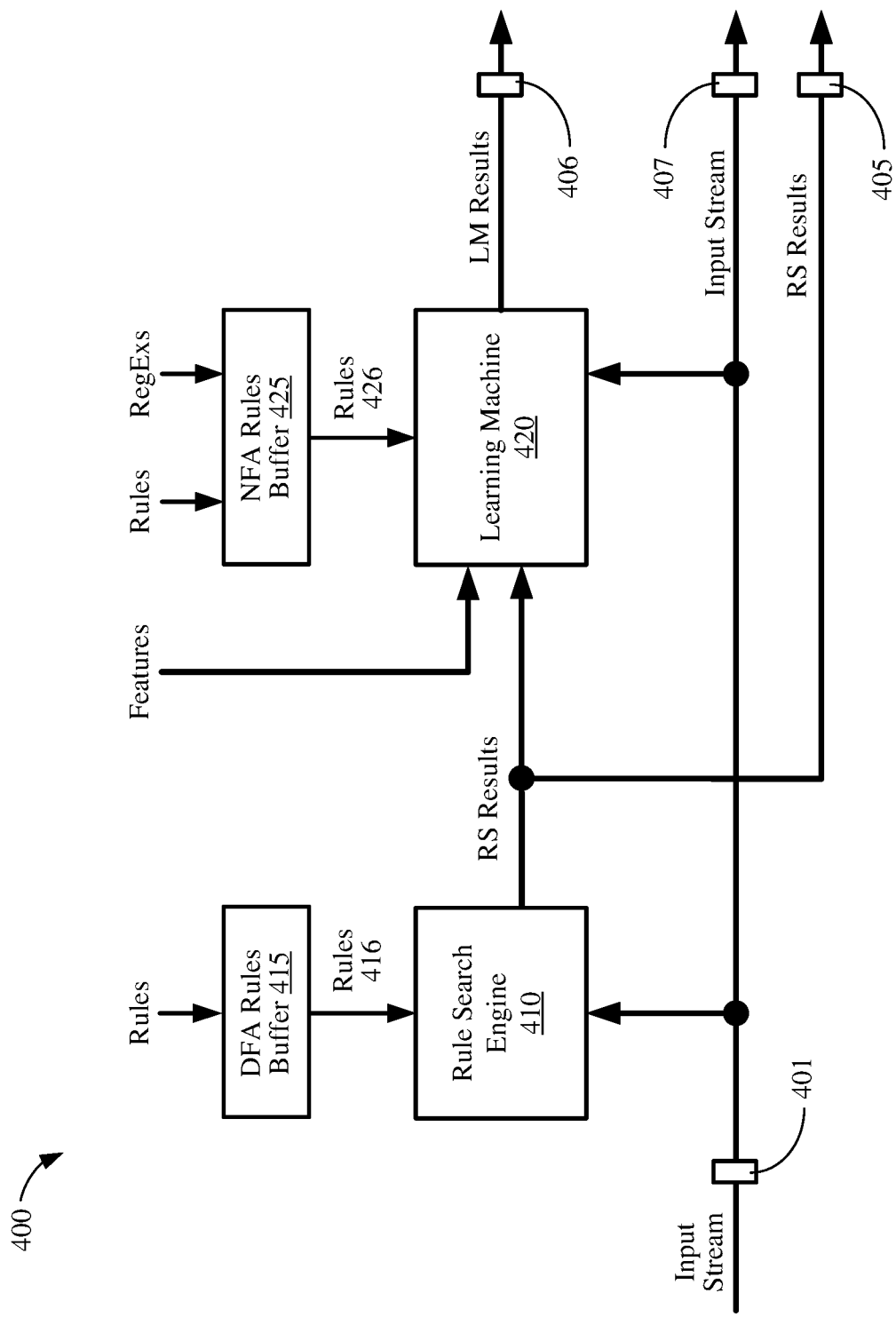
FIG. 4A shows a block diagram of an example classification module, according to some implementations.

FIG. 4A shows a block diagram of an example classification module 400, according to some implementations. The classification module 400, which may be one implementation of the classification module 330 of FIG. 3, may include an input terminal 401, one or more output terminals 405-407, a rule search engine 410, a DFA rules buffer 415, a learning machine 420, and an NFA rules buffer 425.

The DFA rules buffer 415 may store a plurality of rules 416 received from a source within the control plane 302, and may forward or otherwise make available the rules 416 to the rule search engine 410. In some implementations, the policy engine 340 of FIG. 3 may provide the rules 416 to the DFA rules buffer 415. Although not shown for simplicity, the classification module 400 may include a rule compression engine configured to compress incoming rules (such as from the DFA rule buffer 415), for example, by replacing repeated occurrences of certain character strings with substantially smaller "tokens" to yield a compressed version of the rules for storage. In this manner, the rule compression engine may allow for a substantial reduction in the amount of memory needed to storage all of the sets of rules. In some implementations, rules may be delivered alternatively as a full set of replacement rules and/or as occasional updates to a previously delivered or accumulated rule database, and thus the temporary storage of rules prior to delivery and implementation within rule search engine may be unnecessary, for example, depending on the rule delivery rate and/or the rule format. In such implementations, the DFA rule buffer 415 may be omitted.

The rule search engine 410, which may be a hardware-accelerated deterministic finite automaton (DFA), receives inbound traffic from the data plane 301, applies one or more sets of rules 416 to the inbound traffic received via the input terminal 401, and outputs a rule-search result (RS Result) to notify downstream functional blocks (such as flow management unit 350 of FIG. 3 and/or the learning machine 420 of FIG. 4A) of classification results (i.e., detection of malware or benign traffic) of the contents of the input stream. Although inbound traffic containing the input stream is delivered at line-rate and in real-time, rule delivery and other control plane operations may occur at slower rates and/or during times of relatively low traffic or even zero traffic (such as when run-time operation of the host network security appliance is suspended for maintenance or other down-time). In some instances, the rule search engine 410 may be able to classify a given portion of the input stream (or within the entire input stream) containing all portions of a particular malware signature or benign signature, and therefore further processing and analysis may not be needed. In such instances, the RS results provided by the rule search engine 410 may be used to classify portions of the input stream as malicious or benign (e.g., without using the learning machine 420), and the RS results generated by the rule search engine 410 may be used as the output signals of the classification module 400, for example, as provided via output terminal 405.

The NFA rules buffer 425 may store a plurality of relatively complex rules 426 (as compared to the rules stored in the DFA rules buffer 415) that can be used by the learning machine 420 to classify portions of the network traffic as either malicious or benign. The rules 426 may include (or may be constructed from) rules provided by the policy engine 340, signatures indicative malware and other malicious code or benign traffic, learned features, or any combination thereof. In some implementations, the rules 426 stored in the NFA rules buffer 425 may include regular expressions (RegExs), which may be used to detect more complex and nuanced malware or benign traffic than binary strings, thereby allowing the learning machine 420 to detect a broader range of malware or benign traffic (both known and learned) than the rules search engine 410.

The learning machine 420 includes one or more first inputs to receive an input stream, one or more second inputs to receive rules 426 from the NFA rules buffer 425, a third input to receive a number of features (e.g., to be used during the training of the learning machine 420), and one or more outputs 406 to provide learning machine results (LM results) indicating whether corresponding portions of the input stream are classified as malicious traffic or benign traffic. The features, which for at least some implementations can be extracted or derived from the input stream (e.g., during classification), may include flow-specific information (such as source addresses, destination addresses, policy information, priority information, and the like), may include certain portions of the input stream (such as bits, bytes, words, strings, and the like), may include flow information of the input stream, or any combination thereof. The learning machine 420 may be configured to apply the rules 426 provided by the NFA rules buffer 425, one or more of the features extracted from the input stream, and/or the RS results generated by the rules search engine 410 to detect the presence of malware and other malicious code in the input stream and/or to classify portions of the input stream as malicious or benign. One or more of rules 416, rules 426, the RS Results and the features may constitute all or portions of the classification rules used by classification module 400. In some aspects, the learning machine 420 may provide such detections, classifications, and other output information as learning machine (LM) Results via the one or more output terminals 406. Further, in one or more implementations, the input stream may be provided to output terminal 407 of the learning machine 420.

In some implementations, the learning machine 420 may include a number of learning machines (not shown in FIG. 4A for simplicity) configured to implement a non-deterministic finite automaton (NFA). The learning machine 420 may store any number of machine learning models that can be used to detect whether one or more portions of the network traffic contain malicious or benign code. A machine learning model may take the form of an extensible data structure that can be used to represent sets of words or phrases and/or can be used to represent sets of features or signatures. The machine learning models may be seeded with a large volume of raw data and indications of malware or other malicious code within the raw data, and then trained to "learn" a set of features that can be used to detect or identify the malware or other malicious code or benign code in known traffic flows. Once trained (with supervision), the machine learning models may apply the learned sets of features to unknown traffic flows and infer whether the unknown traffic flows contain malware or other malicious code or benign data. In some implementations, the machine learning models may employ one or more of the machine learning algorithms included in the group of decision trees, random forest, logistic regression, nearest neighbors, classification trees, control flow graphs, support vector machines, naïve bayes, Bayesian Networks, value sets, hidden Markov models, and neural networks.

Although not shown in FIG. 4A for simplicity, the learning machine 420 may include or implement one or more binary learning machines that can classify portions of the input stream as malicious or benign based at least in part on the features. In some implementations, the learning machine 420 may include or implement one or more support vector machines (SVMs) that can separately classify portions of the input stream as malicious or benign. In some aspects, the SVM may use a first set of features to classify portions of the input stream as malicious, and may use a second set of features to classify portions of the input stream as benign. The first and second sets of features may be different, for example, such that the first set of features may be designed or optimized for detecting malware and other malicious code, and the second set of features may be designed or optimized for identifying benign portions of the input stream (e.g., portions of the input stream that do not contain malware or other malicious code). In this manner, the learning machine 420 may actively classify portions of the input stream as benign using a number of features (and also rules, in at least some instances), rather than designating portions of the input stream not found to be malicious as "benign" traffic. Similarly, the learning machine 420 may actively classify portions of the input stream as malicious using a number of features (and also rules, in at least some instances), rather than designating portions of the input stream not found to be benign as "malicious" traffic.

Figure 4B:
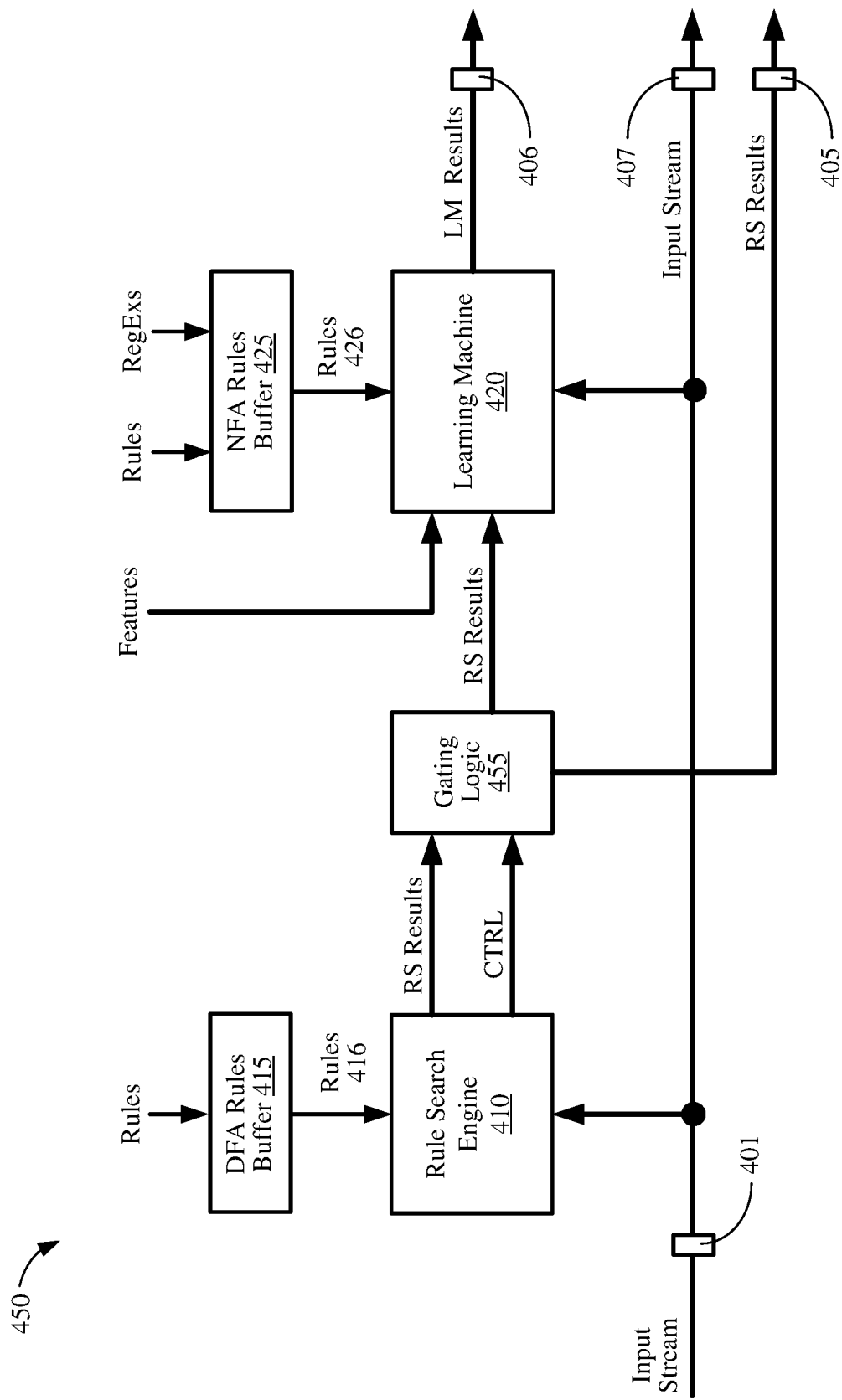
FIG. 4B shows a block diagram of another example classification module, according to some implementations.

FIG. 4B shows a block diagram of another example classification module 450, according to some implementations. The classification module 450, which may be similar to the classification module 400 of FIG. 4A (e.g., the classification module 450 may include all of the circuits, modules, and other components described above with respect to FIG. 4A), also includes gating logic 455 coupled between the rule search engine 410 and the learning machine 420. In some implementations, gating logic 455 may selectively route the RS Results generated by the rule search engine 410 to the learning machine 420 or the output terminal 405. For example, in some instances, the rule search engine 410 may be able to detect or identify all of the malicious code or benign code within a given portion of the input stream (or within the entire input stream), as discussed above. In such instances, gating logic 455 may route the RS results as output signals of the classification module 450 via the output terminal 405, and may not provide the RS results to the learning machine 420 for those portions of the input stream already classified by the rules search engine 410. In other instances for which the rule search engine 410 may not be able to detect or identify malicious or benign code within one or more portions of the input stream, gating logic 455 may provide the RS results for at least the one or more input stream portions to the learning machine 420, and may not route the RS results to output terminal 405.

In some implementations, gating logic 455 may also receive, from the rule search engine 410, one or more control signals (CTRL) that can be used to control various operations of gating logic 455 (as depicted in the example of FIG. 4B). In some aspects, the CTRL signals may indicate whether the rule search engine 410 was able to classify portions of the input stream as malicious or benign, and if so, which input stream portions were so classified. The gating logic 455 may use the CTRL signals to determine whether the RS Results corresponding to each of a number of input stream portions are to be routed to the learning machine 420 or are to be provided as output signals to output terminal 405. In some other implementations, the CTRL signals may also be used to select which portions of the input stream (if any) and/or the RS Results are to be provided to the learning machine 420. In this manner, gating logic 455 and the CTRL signals may be used to selectively provide portions of the input stream and/or the RS Results to the learning machine 420 based on a determination as to which portions of the input stream were found to be malicious or benign by the rules search engine 410.

Figure 5A:
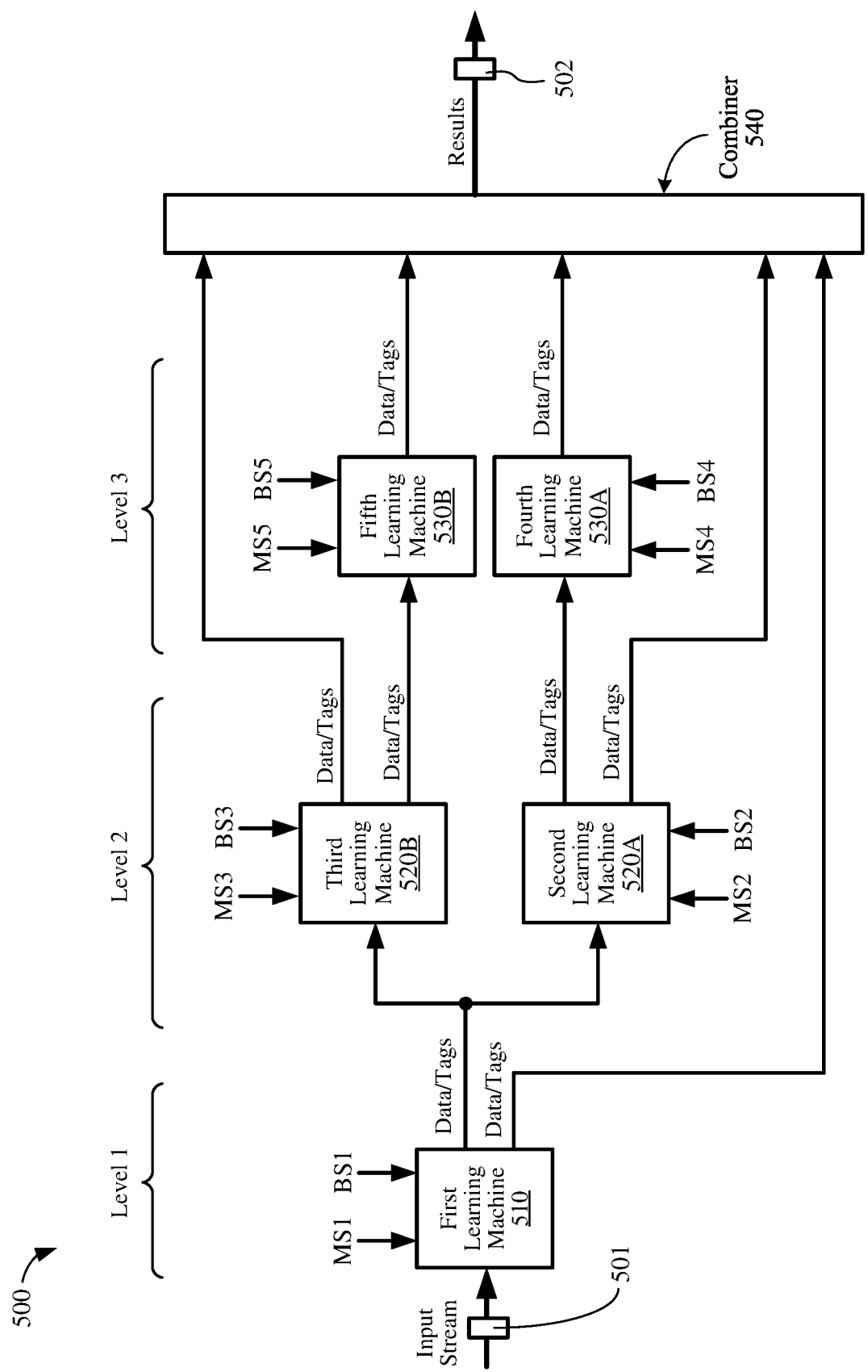
FIG. 5A shows a block diagram of an example learning machine, according to some implementations.

FIG. 5A shows a block diagram of an example learning machine 500, according to some implementations. The learning machine 500, which may be one implementation of the learning machine 420 of FIGS. 4A and 4B, is shown to include an input terminal 501 to receive an input stream, an output terminal 502 to provide one or more results, five learning machines 510, 520A-520B, and 530A-530B, and a signal combiner 540. Each of the learning machines 510, 520A-520B, and 530A-530B may be any suitable machine learning device, component, or module capable of learning and/or inferring sets of classification rules that can be used to detect or identify malicious or benign code in a traffic flow. In some implementations, the learning machines 510, 520A-520B, and 530A-530B may be implemented using one or more of a general purpose single-chip or multi-chip processor, a digital signal processor (DSP), an application specific integrated circuit (ASIC), a field programmable gate array (FPGA) or other programmable logic device, graphics processing unit (GPU), discrete gate or transistor logic, discrete hardware components, or software. The combiner 540, which may be implemented using any suitable logic or other circuitry, may combine the output signals generated by the five learning machines 510, 520A-520B, and 530A-530B to provide one or more result signals indicating whether malware (or other malicious code) or benign traffic was detected in the input stream, and if so, identifying those portions of the input stream determined to be malicious and those portions of the input stream determined to be benign. In some implementations, the one or more result signals may include a number of tags identifying portions of the input stream that were classified as malicious (if any) and identifying portions of the input stream that were classified as benign (if any).

The five learning machines 510, 520A-520B, and 530A-530B are arranged in three hierarchical levels in the example of FIG. 5A, with the learning machines in each hierarchical level receiving input signals from the learning machines in a previous hierarchical level. In other implementations, the learning machine 500 may include a greater (or fewer) number of learning machines arranged in other suitable numbers of hierarchical levels. Thus, the particular architecture shown in FIG. 5A is but one example of a variety of different architectures within which aspects of the present disclosure may be implemented.

For the example of FIG. 5A, the first hierarchical level includes the first learning machine 510, the second hierarchical level includes the second learning machine 520A and the third learning machine 520B, and the third hierarchical level includes the fourth learning machine 530A and the fifth learning machine 530B. The first learning machine 510 includes a data input to receive the input stream via input terminal 501, control inputs to receive classification rules MS1 (which may include a first set of malware classification rules) and classification rules BS1 (which may include a first set of benign classification rules), and outputs to provide one or more portions of the input stream (e.g., data) and one or more tags indicating whether corresponding portions of the input stream were classified as malicious or benign by the first learning machine 510.

The second learning machine 520A includes a data input to receive first portions of the input stream classified by the first learning machine 510, control inputs to receive classification rules MS2 (which may include a second set of malware classification rules) and classification rules BS2 (which may include a second set of benign classification rules), and outputs to provide one or more portions of the input stream and one or more tags indicating whether corresponding portions of the input data were classified as malicious or benign by the second learning machine 520A. The third learning machine 520B includes a data input to receive second portions of the input stream classified by the first learning machine 510, control inputs to receive classification rules MS3 (which may include a third set of malware classification rules) and classification rules BS3 (which may include a third set of benign classification rules), and outputs to provide one or more portions of the input stream and one or more tags indicating whether corresponding portions of the input data were classified as malicious or benign by the third learning machine 520B. In some implementations, the classification rules MS1 may be different than the second and third sets of classification rules MS2 and MS3, and classification rules BS1 may be different than the second and third sets of classification rules BS2 and BS3. In some aspects, the second and third sets of classification rules MS2 and MS3 may be different than each other, and the second and third sets of classification rules BS2 and BS3 may be different than each other. In other aspects, the second and third sets of classification rules MS2 and MS3 may be the same as each other (or at least similar to each other), the second and third sets of classification rules BS2 and BS3 may be the same as each other (or at least similar to each other).

The fourth learning machine 530A includes a data input to receive data portions classified by the second learning machine 520A, a control inputs to receive classification rules MS4 (which may include a fourth set of malware classification rules) and classification rules BS4 (which may include a fourth set of benign classification rules), and outputs to provide one or more portions of the input stream and one or more tags indicating whether corresponding portions of the input data were classified as malicious or benign by the fourth learning machine 530A. The fifth learning machine 530B includes a data input to receive data portions classified by the third learning machine 520B, a control inputs to receive classification rules MS5 (which may include a fifth set of malware classification rules) and classification rules BS5 (which may include a fifth set of benign classification rules), and outputs to provide one or more portions of the input stream and one or more tags indicating whether corresponding portions of the input data were classified as malicious or benign by the fifth learning machine 530B. In some implementations, the fourth and fifth sets of classification rules MS4 and MS5 are different than the first, second, and third sets of classification rules MS1-MS3, and the fourth and fifth sets of classification rules BS4 and BS5 are different than the first, second, and third sets of classification rules BS1-BS3. In some aspects, the fourth and fifth sets of classification rules MS4 and MS5 may be different than each other, and the fourth and fifth sets of classification rules BS4 and BS5 may be different than each other. In other aspects, the fourth and fifth sets of classification rules MS4 and MS5 may be the same as each other (or at least similar to each other), and the fourth and fifth sets of classification rules BS4 and BS5 may be the same as each other (or at least similar to each other).

As discussed above, each of the learning machines 510, 520A-520B, and 530A-530B may be individually configured to classify portions of the input stream as malicious based at least in part on its corresponding set of classification rules MS1-MS5, respectively, and may also be individually configured to classify portions of the input stream as benign based at least in part on its corresponding set of classification rules BS1-BS5, respectively. In alternative embodiments, each of the learning machines 510, 520A-520B, and 530A-530B may receive only one set of classification rules, which may be unique for each hierarchy. For such an embodiment, a first set of classification rules may be for detecting malicious traffic and the absence such a detection would indicate that the traffic was benign. Similarly, in such an embodiment, a second set of classification rules may be for detecting benign traffic and the absence of such a detection would indicate that the traffic was malicious.

The three hierarchical levels may allow the input stream to be cross-screened for malware and/or benign traffic, for example, such that portions of the input stream are first classified as malicious or benign by a learning machine in a first hierarchical level, and then the same portions, or subsets or supersets thereof, are subsequently rescreened and classified again as either malicious or benign by the learning machines in one or more subsequent hierarchical levels. In this manner, the learning machine 500 may reduce the number of false positive and false negative classification results.

For example, if a portion of the input stream is classified as malicious by the learning machine in the first hierarchical level, it is possible that the portion is actually benign. Relying solely on the classification result from the first learning machine may cause the learning machine 500 to incorrectly classify that portion (i.e., generate a false positive result). To prevent or at least reduce the likelihood of such false positives, that portion of the input stream may be provided to the learning machines in one or more subsequent hierarchical levels for additional analysis and classification, for example, to increase the confidence level with which that portion of the input stream is classified as malicious. More specifically, if a learning machine in each of the second and third hierarchical level classifies that portion of the input stream as benign, then the learning machine 500 may determine that the input stream portion does not contain malware (e.g., because two out of three, and thus a majority, of the hierarchical levels classified the same input stream portion as benign). Conversely, if a learning machine in either the second or third hierarchical level classifies that portion of the input stream as malicious, then the learning machine 500 may determine that the input stream portion does indeed contain malware (e.g., because two out of three, and thus a majority, of the hierarchical levels classified the same input stream portion as malicious). This cross-screening process decreases the likelihood that the learning machine 500 will classify that portion of the input stream as a false positive.

Likewise, if a portion of the input stream is classified as benign by the learning machine in the first hierarchical level, it is possible that the portion is actually malicious. Relying solely on the classification result from the first learning machine may cause the learning machine 500 to incorrectly classify that portion (i.e., generate a false negative result). To prevent or at least reduce the likelihood of such false negatives, that portion of the input stream may be provided to the learning machines in one or more subsequent hierarchical levels for additional analysis and classification, for example, to increase the confidence level with which that portion of the input stream is classified as benign. More specifically, if a learning machine in each of the second and third hierarchical levels classifies that portion of the input stream as malicious, then the learning machine 500 may determine that the input stream portion does indeed contain malware (e.g., because two out of three, and thus a majority, of the hierarchical levels classified the same input stream portion as malicious). Conversely, a learning machine in either the second or third hierarchical level classifies that portion of the input stream as benign, then the learning machine 500 may determine that the input stream portion does not contain malware (e.g., because two out of three, and thus a majority, of the hierarchical levels classified the same input stream portion as benign). This cross-screening process decreases the likelihood that the learning machine 500 will classify that portion of the input stream as a false negative.

In some implementations, the learning machine 500 may determine that a particular portion of an input stream is malicious if the learning machines in any two of the three hierarchical levels (i.e., a majority of the learning machines) classify the particular portion of the input stream as malicious, and may determine that a particular portion of an input stream is benign if any of the learning machines in two of the three hierarchical levels (i.e., a majority of the learning machines) classify the particular portion of the input stream as benign.

For example, if a portion of the input stream is classified as malicious by the learning machines in both the first and second hierarchical levels, the learning machine 500 may determine that the portion of the input stream is malicious (e.g., because both hierarchical levels that analyzed the input stream portion classified the input stream as malicious). Similarly, if a portion of the input stream is classified as benign by the learning machines in both the first and second hierarchical levels, the learning machine 500 may determine that the portion of the input stream is benign (e.g., because both hierarchical levels that analyzed the input stream portion classified the input stream as benign).

In some implementations, each of the learning machines 510, 520A-520B, and 530A-530B may embed its ID and its classification result of a corresponding portion of an input stream as a tag, and may attach the tag (along with other tags, if any) to the traffic flow. In some instances, the tags generated by the learning machines 510, 520A-520B, and 530A-530B may be pre-pended to a beginning of the traffic flow. In other aspects, the tags generated by the learning machines 510, 520A-520B, and 530A-530B may be appended to an end of the traffic flow.

Figure 5B:
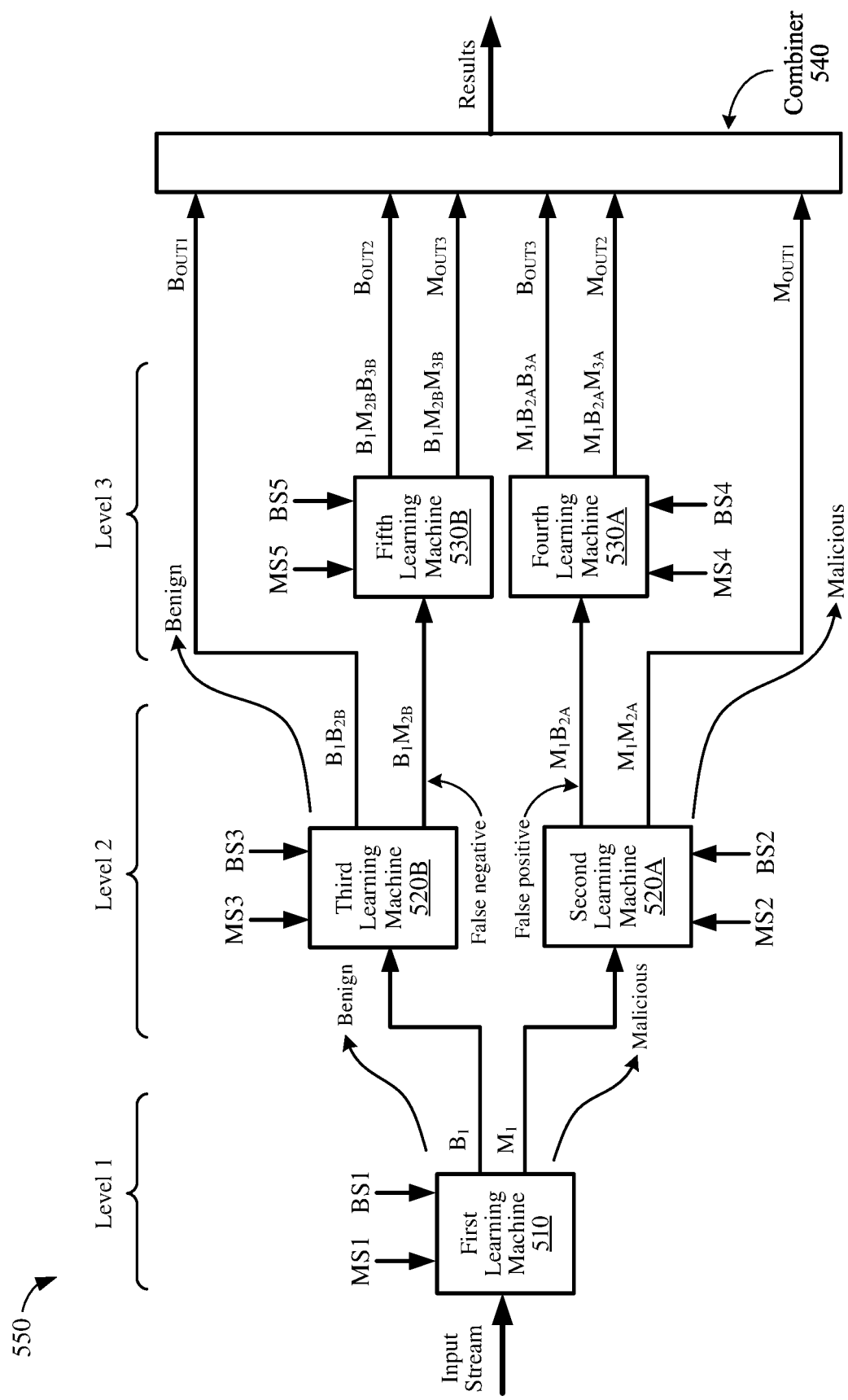
FIG. 5B illustrates an example process flow in the learning machine of FIG. 5A, according to some implementations.

FIG. 5B illustrates an example process flow 550 in the learning machine 500 of FIG. 5A. Prior to receiving input data such as network traffic, sets of classification rules MS1-MS5 and BS1-BS5 are generated and provided to respective ones of the learning machines 510, 520A-520B, and 530A-530B. An input stream (such as a network traffic flow or a portion thereof) received by the learning machine 500 may be provided to the data input of the first learning machine 510. The first learning machine 510 may search the input stream for malware or benign traffic using the classification rules MS1 and BS1, and may classify portions of the input stream accordingly. More specifically, the first learning machine 510 may classify a first portion ($M_1$) of the input stream as malicious based on a match between the first portion and classification rules MS1, and may classify a second portion ($B_1$) of the input stream as benign based on a match between the second portion and classification rules BS1. In some aspects, the first learning machine 510 may generate a number of first tags identifying the first portion ($M_1$) of the input stream as malicious, and may generate a number of second tags identifying the second portion ($B_1$) of the input stream as benign (for simplicity, the tags are not shown in FIG. 5B).

The second learning machine 520A may search the first portion ($M_1$) of the input stream for malware or benign traffic using the classification rules MS2 and BS2, respectively, and may classify portions of the first portion ($M_1$) of the input stream accordingly. More specifically, the second learning machine 520A may classify at least part ($M_1M_{2A}$) of the first portion of the input stream as malicious based on a match between the at least part of the first portion of the input stream and the classification rules MS2, and may classify another part ($M_1B_{2A}$) of the first portion of the input stream as benign based on a match between the other part ($M_1B_{2A}$) of the first portion of the input stream and the classification rules BS2. In some implementations, the at least part ($M_1M_{2A}$) of the first portion of the input stream may be classified as malware based on the matches in both the first learning machine 510 and the second learning machine 520A, and the other part ($M_1B_{2A}$) of the first portion of the input stream may be classified as a false positive candidate based on the different results generated by the first learning machine 510 and the second learning machine 520A.

For example, the at least part ($M_1M_{2A}$) of the first portion of the input stream may be classified as malicious because the learning machines in both the first and second hierarchical levels classified the same portion of the input stream as malicious using different sets of classification rules MS1 and MS2. Conversely, the other part ($M_1B_{2A}$) of the first portion of the input stream may be classified as a false positive candidate because the learning machines in the first and second hierarchical levels reached different conclusions as to whether that part of the input stream was malicious or benign. In some aspects, the second learning machine 520A may generate a number of first tags identifying the at least part ($M_1M_{2A}$) of the first portion of the input stream as malicious, and may generate a number of second tags identifying the other part ($M_1B_{2A}$) of the first portion of the input stream as a false positive candidate (for simplicity, the tags are not shown in FIG. 5B).

The third learning machine 520B may search the second portion ($B_1$) of the input stream for malware or benign traffic using the classification rules MS3 and BS3, respectively, and may classify portions of the second portion ($B_1$) of the input stream accordingly. More specifically, the third learning machine 520B may classify at least part ($B_1B_{2B}$) of the second portion ($B_1$) of the input stream as benign based on a match between the at least part ($B_1B_{2B}$) of the second portion ($B_1$) of the input stream and the classification rules BS3, and may classify another part ($B_1M_{2B}$) of the second portion ($B_1$) of the input stream as malicious based on a match between the other part ($B_1M_{2B}$) of the second portion ($B_1$) of the input stream and the classification rules MS3. In some implementations, the at least part ($B_1B_{2B}$) of the second portion ($B_1$) of the input stream may be classified as benign based on the matches in both the first learning machine 510 and the third learning machine 520B, and the other part ($B_1M_{2B}$) of the second portion ($B_1$) of the input stream may be classified as a false negative candidate based on the different results generated by the first learning machine 510 and the third learning machine 520B.

For example, the at least part ($B_1B_{2B}$) of the second portion ($B_1$) of the input stream may be classified as benign because the learning machines in both the first and second hierarchical levels classified the same portion of the input stream as benign using different sets of classification rules BS1 and BS2. Conversely, the other part ($B_1M_{2B}$) of the second portion ($B_1$) of the input stream may be classified as a false negative candidate because the learning machines in the first and second hierarchical levels reached different conclusions as to whether that part of the input stream was malicious or benign. In some aspects, the third learning machine 520B may generate a number of first tags identifying the at least part ($B_1B_{2B}$) of the second portion ($B_1$) of the input stream as benign, and may generate a number of second tags identifying the other part ($B_1M_{2B}$) of the second portion ($B_1$) of the input stream as a false negative candidate (for simplicity, the tags are not shown in FIG. 5B).

The fourth learning machine 530A may search the other part ($M_1B_{2A}$) of the first portion ($M_1$) of the input stream for malware or benign traffic using the classification rules MS4 and BS4, respectively, and may classify portions of the other part ($M_1B_{2A}$) of the first portion ($M_1$) of the input stream accordingly. More specifically, the fourth learning machine 530A may classify the other part ($M_1B_{2A}$) of the first portion ($M_1$), which was classified as a false positive candidate by the second learning machine 520A, as malicious ($M_1B_{2A}M_{3A}$) if there is a match between the other part ($M_1B_{2A}$) of the first portion ($M_1$) with the classification rules MS4, or benign ($M_1B_{2A}B_{3A}$) if there is a match between the other part ($M_1B_{2A}$) of the first portion ($M_1$) and the classification rules BS4. In some implementations, the other part ($M_1B_{2A}$) of the first portion ($M_1$) of the input stream may be classified as malicious based on matches with different sets of classification rules in both the first learning machine 510 and the second learning machine 520A, and may be classified as benign based on matches with different sets of classification rules in two learning machines 520A and 530A. In some aspects, the fourth learning machine 530A may generate a number of first tags identifying the portion ($M_1B_{2A}M_{3A}$) as malicious, and may generate a number of second tags identifying the portion ($M_1B_{2A}B_{3A}$) as benign (for simplicity, the tags are not shown in FIG. 5B). By reclassifying the false positive candidate as either malicious or benign based on further analysis and processing, the fourth learning machine 530A may reduce the number of false positives generated by the malware detection system.

The fifth learning machine 530B may search another part ($B_1M_{2B}$) of the second portion ($B_1$) of the input stream for malware or benign traffic using the classification rules MS5 and BS5, respectively, and may classify portions of the other part ($B_1M_{2B}$) of the second portion ($B_1$) of the input stream accordingly. More specifically, the fifth learning machine 530B may reclassify the other part ($B_1M_{2B}$) of the second portion ($B_1$), which was classified as a false negative candidate by the third learning machine 520B, as malicious ($B_1M_{2B}$ $M_{3B}$) if there is a match between the other part ($B_1M_{2B}$) of the second portion ($B_1$) with the classification rules MS5, or benign ($B_1M_{2B}$ $B_{3B}$) if there is a match between the other part ($B_1M_{2B}$) of the second portion ($B_1$) with the classification rules BS5. In some implementations, the other part ($B_1M_{2B}$) of the second portion ($B_1$) of the input stream may be classified as malicious based on matches with different sets of classification rules in two learning machines 520B and 530B, and may be classified as benign based on matches with different sets of classification rules in two learning machines 510 and 530B. In some aspects, the fifth learning machine 530B may generate a number of first tags identifying the portion ($B_1M_{2B}$ $M_{3B}$) as malicious, and may generate a number of second tags identifying the portion ($B_1M_{2B}$ $B_{3B}$) as benign (for simplicity, the tags are not shown in FIG. 5B). By reclassifying the false negative candidate as either malicious or benign based on further analysis and processing, the fifth learning machine 530B may reduce the number of false negatives generated by the malware detection system.

The combiner 540 may receive the tags generated by each of learning machines 510, 520A-520B, 530A-530B, and may use the tags and traffic flow information to identify portions of the input stream determined to be malicious, and to identify portions of the input stream determined to be benign. Once identified, portions of the input stream containing malware or malicious code may be prevented from transmission (such as by blocking corresponding portions of a traffic flow), may be quarantined for subsequent analysis, may be flagged for tracing, or may be subject to some other action or operation. In some implementations, the combiner 540 may apply weighting factors to one or more of the tags generated by the learning machines 510, 520A-520B, 530A-530B, and determine a weighted combination of the tags for use in identifying or tracking malicious and/or benign portions of the input stream.

Figure 6A:
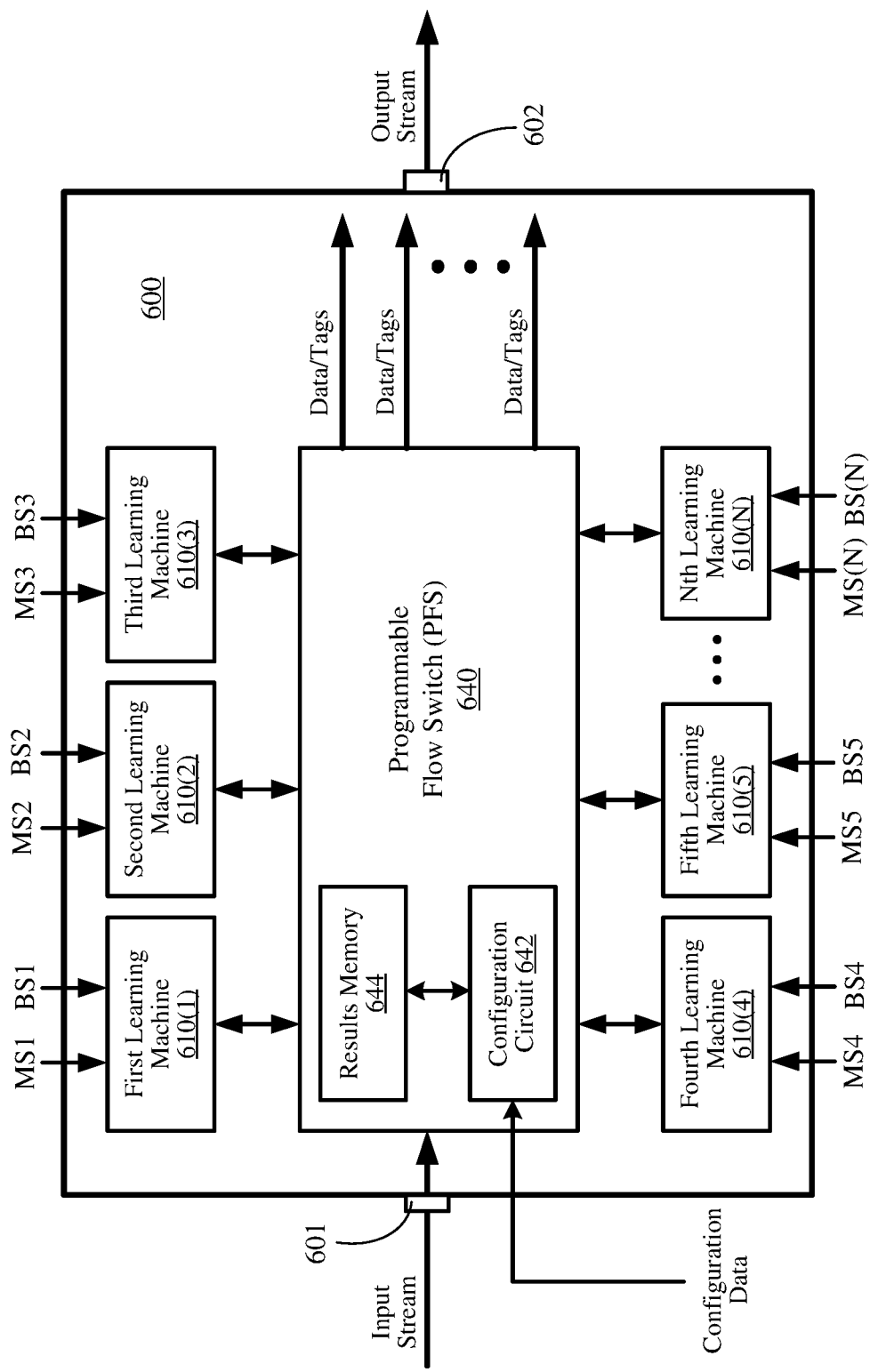
FIG. 6A shows a block diagram of another example learning machine, according to some implementations.

FIG. 6A shows a block diagram of learning machine 600, according to some implementations. The learning machine 600, which may be another implementation of the learning machine 420 of FIG. 4A (or FIG. 4B), is shown to include an input terminal 601 to receive an input stream, an output terminal 602 to provide one or more results, a plurality of learning machines 610(1)-610(N), and a programmable flow switch (PFS) 640. Each of the learning machines 610(1)-610(N) may be any suitable learning machine, circuit, device, or module that can detect malware or other malicious code in the input stream and classify portions of the input stream as malicious or benign based at least in part on a number of classification rules, including classification rules for the detection of malicious traffic and/or classification rules for benign traffic. In some implementations, the learning machines 610(1)-610(N) may be examples of the learning machines 510, 520A-520B, and 530A-530B discussed above with respect to FIGS. 5A-5B.

The programmable flow switch (PFS) 640 includes a first input coupled to input terminal 601, a second input to receive configuration data, a number of bi-directional ports coupled to the learning machines 610(1)-610(N), and a number of outputs that can be selectively coupled to output terminal 602. In some implementations, the PFS 640 may also include (or may be coupled to) a configuration circuit 642 and a results memory 644, for example, as depicted in FIG. 6A. The results memory 644, which may be any suitable register, buffer, latch, or memory device, may store results generated by one or more of the learning machines 610(1)-610(N), and/or output results provided by the learning machine 600. The configuration circuit 642 includes a first port to receive configuration data (e.g., from another circuit or a user), includes a second port to receive one or more of the results stored in the results memory 644, and may be used to configure various aspects of the learning machine 600 based the configuration data and/or the results. In some other implementations, one or both of the configuration circuit 642 and the results memory 644 may be external to the PFS 640.

In accordance with some aspects of the present disclosure, the PFS 640 may be used to dynamically configure (or re-configure) the signal interconnections between any number of the learning machines 610(1)-610(N), the input terminal 601, and the output terminal 602 based on one or both of the configuration data and the stored results. In some implementations, the PFS 640 may selectively interconnect any number of the learning machines 610(1)-610(N) in a multitude of different configurations or hierarchies based on the configuration data. For example, in some instances, the configuration data may cause the PFS 640 to interconnect five of the learning machines 610(1)-610(N) in a configuration that implements the learning machine 500 of FIGS. 5A-5B. For another example, the configuration data may also cause the PFS 640 to provide signal connections between the five learning machines 610(1)-610(N), in addition to those depicted in FIGS. 5A-5B, to route the results provided by each of a selected number of the learning machines 610(1)-610(N) to multiple other learning machines 610(1)-610(N) in the same or different hierarchical levels and/or to route the results from one or more of the learning machines 610(1)-610(N) to other learning machines 610(1)-610(N) in non-adjacent hierarchical levels (e.g., thereby allowing the results generated in one hierarchical level to "skip" at least one hierarchical level). These additional signal interconnections may be used to re-configure portions of the learning machine 600, for example, based on pattern recognition, machine learnings, and so on.

In addition, or in the alternative, the PFS 640 may selectively interconnect any number of the learning machines 610(1)-610(N) in a multitude of different configurations, and/or may dynamically provide or remove a number of signal interconnections between various learning machines 610(1)-610(N) based on the results generated by a selected number of the learning machines 610(1)-610(N). In some implementations, the results generated by one or more selected learning machines 610(1)-610(N) may be analyzed or processed to identify other (more optimal) learning machine configurations, and may be provided to the configuration circuit 642 so that the PFS 640 can reconfigure the signal interconnections between the learning machines 610(1)-610(N) accordingly.

The PFS 640 may also be used to statically or dynamically direct a traffic flow along different paths through the learning machine 600 based at least in part on one or more characteristics of the traffic flow. These characteristics, which for at least some implementations may be embodied in the features provided to the learning machines 610(1)-610(N), may include (but are not limited to) a nature of the traffic flow, a type or class of traffic, source and destination addresses of the traffic flow, and any other suitable characteristic that can be used to improve performance and/or the accuracy with which the learning machine 600 can classify portions of a traffic flow as malicious or benign.

In one or more implementations, the PFS 640 may use the results generated by one or more of the learning machines 610(1)-610(N) to dynamically reconfigure the signal interconnections between the learning machines 610(1)-610(N), to "insert" one or more additional learning machines 610(1)-610(N) into an existing learning machine configuration, to "remove" one or more learning machines 610(1)-610(N) from the existing learning machine configuration, and/or to modify the path along which a particular traffic flow propagates through the various interconnected learning machines 610(1)-610(N). In this manner, the PRS 640 can dynamically modify a particular learning machine configuration and/or a particular traffic flow through the learning machines 610(1)-610(N) based on the results generated by one or more of the learning machines 610(1)-610(N).

As shown in FIG. 6A, the PFS 640 may provide data and tags as output signals. In some implementations, the data may include some or all of a particular traffic flow (e.g., depending on whether one or more portions of the input stream were classified as malicious or benign), and the tags may contain the processing history of the traffic flow through the various learning machines. For example, in some aspects, each tag may identify the learning machines 610(1)-610(N) that processed a corresponding portion of the input stream, may indicate which learning machines 610(1)-610(N) classified the corresponding portion as malicious (if any), may indicate which learning machines 610(1)-610(N) classified the corresponding portion as benign (if any), or any combination thereof.

Figure 6B:
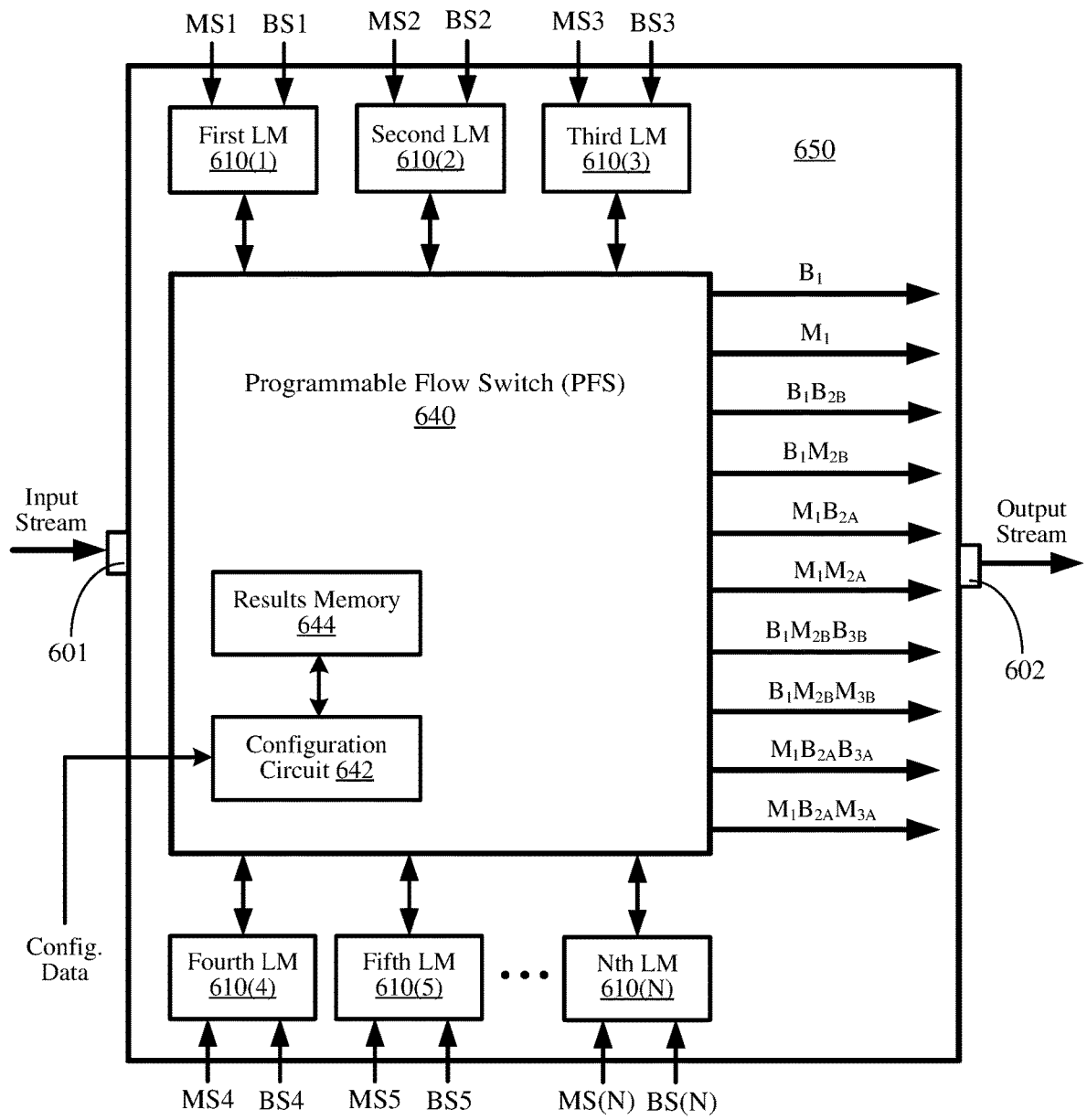
FIG. 6B illustrates an example process flow in the learning machine of FIG. 6A, according to some implementations.

FIG. 6B shows an example configuration 650 of the learning machine 600 of FIG. 6A. In some aspects, the example configuration 650 may implement the learning machine 550 of FIG. 5B. Although not shown in FIG. 6B for simplicity, five of the learning machines 610(1)-610(N) may be arranged and interconnected in the manner depicted in FIG. 5B, for example, such that the PFS 640 configures the learning machines 610(1)-610(N) to operate in the manner described above with respect to FIG. 5B.

FIG. 7A shows a flow diagram 700 depicting an example input stream (such as a traffic flow) propagating through a learning machine, according to some implementations. The flow diagram 700 is described with respect to the learning machines 500 and 550 of FIGS. 5A and 5B, respectively, for illustrative purposes only. It is to be understood that various aspects disclosed herein may be used with any suitable learning machine. As shown, a portion of the input stream is classified as malicious by the first learning machine 510, and is provided to the second learning machine 520A as data portion $M_1$. The data portion $M_1$ is classified by the second learning machine 520A as benign, and is provided to the fourth learning machine 530A as data portion $M_1B_{2A}$. The data portion $M_1B_{2A}$ is classified as benign by the fourth learning machine 530A. For the example flow diagram 700, the results generated by the other learning machines (depicted in dashed lines) may be ignored.

FIG. 7B shows a flow diagram 750 depicting another example input stream (such as a traffic flow) propagating through a learning machine, according to some implementations. The flow diagram 750 is described with respect to the learning machines 500 and 550 of FIGS. 5A and 5B, respectively, for illustrative purposes only. It is to be understood that various aspects disclosed herein may be used with any suitable learning machine. As shown, a portion of the input stream is classified as benign by the first learning machine 510, and is provided to the third learning machine 520B as data portion $B_1$. The data portion $B_1$ is classified by the third learning machine 520B as malicious, and is provided to the fourth learning machine 530A and to the fifth learning machine 530B, concurrently, as data portion $B_1M_{2B}$. The data portion $B_1M_{2B}$ is classified by the fourth learning machine 530A as malicious and provided for output as data portion $B_1B_{2A}M_{3A}$, and the data portion $B_1M_{2B}$ is classified by the fifth learning machine 530B as benign and provided for output as data portion $B_1M_{2B}B_{3B}$.

As depicted in FIG. 7B, the input stream may be duplicated, propagated along different paths, and concurrently classified by the fourth learning machine 530A and the fifth learning machine 530B. In some implementations, the results generated by the fourth and fifth learning machines 530A-530B may be combined to determine a "final" classification of the input stream. In some other implementations, the results generated by the fourth and fifth learning machines 530A-530B may be weighted (e.g., using one or more weighting factors), and the weighted combination of the results computed and used as the final classification for the input stream. One of the fourth and fifth learning machines 530A and 530B may have a higher weight than the other, and thus the result of the higher weighted learning machine may determine the final classification.

For some embodiments, each of the learning machines disclosed in the examples discussed herein may be assigned a weight that indicates the significance of each learning machines' classification results as compared to the classification results generated by the other learning machines in the system. In some aspects, the weighted combination of the learning machines' results may be determined using the equation below:

$$D = \alpha_1 RS_1 + \alpha_2 RS_2 + \alpha_3 RS_3 + \alpha_4 RS_4 + \alpha_5 RS_5 + \ldots,$$

where $\alpha_1$-$\alpha_5$ are weighting coefficients, and $RS_1$-$RS_5$ are the individual classification results generated by each of the five corresponding learning machines, which may each be a numerical value that may be assigned to each learning machine. The weighting coefficients may be dynamically assigned or programmed (e.g., by the configuration circuit 642 or PFS 640) based on the efficiency, thoroughness, robustness, type, or content of each of the classification rules (which includes classification rules for detecting malware and for detecting benign traffic). In some embodiments, the weighting coefficients can be structured such that all learning machines in a particular hierarchical level have the same values. In other embodiments, the weighting coefficients may be different for each learning machine, or the same for a subset of machines and different for others. By allowing each learning machine to have programmable weighting coefficients, in some embodiments a final classification decision can be made by less than a majority of learning machines. For example, the learning machines in the last hierarchical level may have weighting coefficients that are greater than the sum of all weighting coefficients assigned to the learning machines in all prior hierarchical levels, the learning machines in the last two hierarchical levels may have weighting coefficients that are greater than the sum of all weighting coefficients assigned to the learning machines in all prior hierarchical levels, or for a learning machine system with five hierarchical levels, for example, the learning machines in the second and fifth hierarchical levels may have weighting coefficients that are greater than the sum of the weighting coefficients assigned to the learning machines in the first, third, and fourth hierarchical levels. In some embodiments different weighting coefficients may be assigned to malware classification rule sets and benign classification rule sets, even those rule set provided to the same learning machine.

Figure 8:
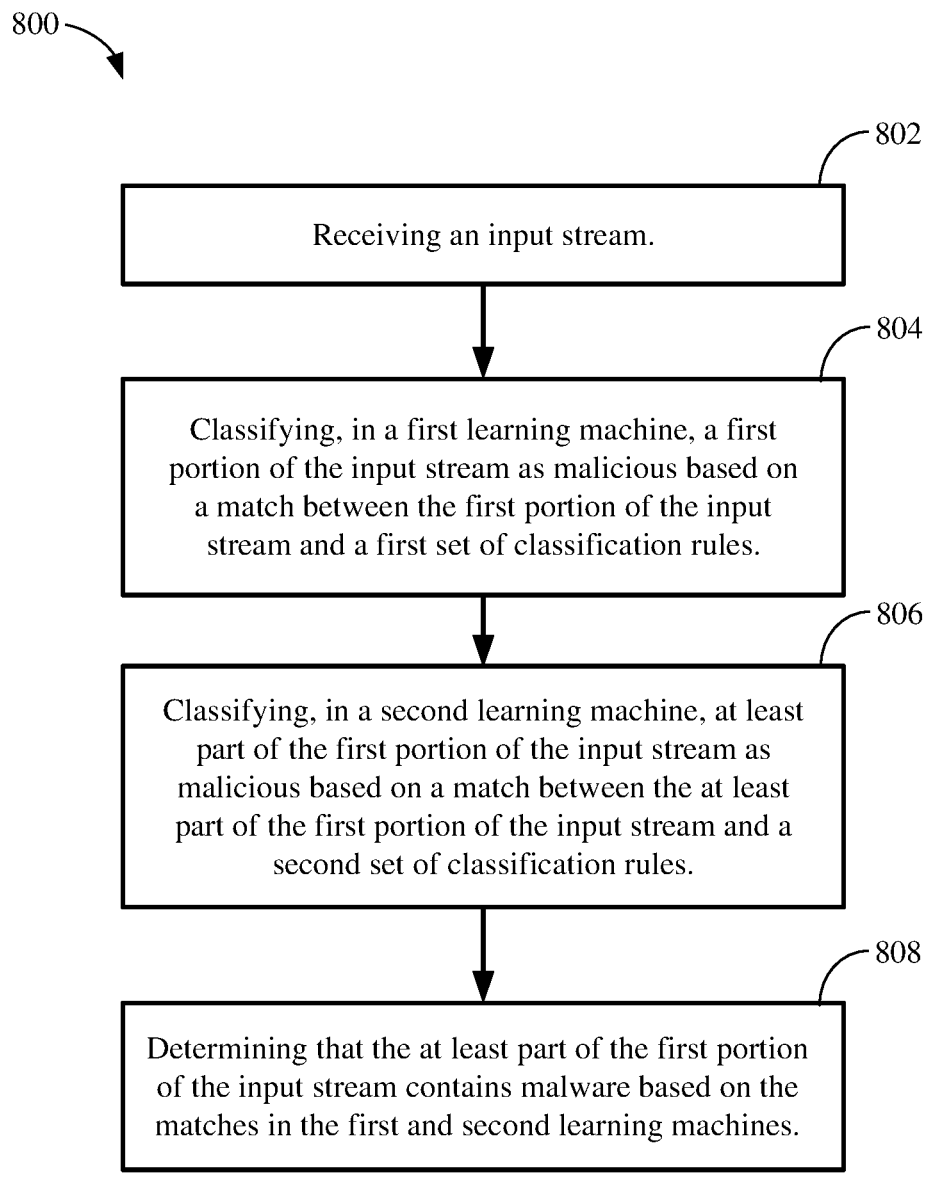
FIG. 8 shows a flow chart depicting an example operation for detecting a presence of malware in a network traffic flow, according to some implementations.

FIG. 8 shows a flow chart depicting an example operation 800 for classifying network traffic as containing malware. The example operation 800 is described below with respect to learning machine 500 of FIG. 5A (or FIG. 5B) and the network security appliance 200 of FIG. 2 for illustrative purposes only. It is to be understood that the example operation 800 may be performed by other suitable systems, computers, or servers. Referring also to Figure the operation 800 may begin in block 802 with receiving an input stream. The operation 800 proceeds at block 804 with classifying, in a first learning machine 510, a first portion ($M_1$) of the input stream as malicious based on a match between the first portion of the input stream and a first set of classification rules (e.g., the classification rules MS1). The operation 800 proceeds at block 806 with classifying, in a second learning machine 520A, at least part ($M_1M_{2B}$) of the first portion ($M_1$) of the input stream as malicious based on a match between the at least part ($M_1M_{2B}$) of the first portion ($M_1$) of the input stream and a second set of classification rules (e.g., the classification rules MS2). The operation 800 proceeds at block 808 with determining that the at least part of the first portion of the input stream contains malware based on the matches in both the first learning machine 510 and second the learning machine 520A. In some implementations, determining that the at least part ($M_1M_{2B}$) of the first portion ($M_1$) of the input stream is malicious in block 806 may be based on the number of learning machines classifying that data portion as malicious being greater than the number of learning machines classifying that data portion as benign (e.g., such that a majority of the learning machines that processed the at least part ($M_1M_{2B}$) of the first portion ($M_1$) of the input stream determined that portion of the input stream to be malicious).

Figure 9:
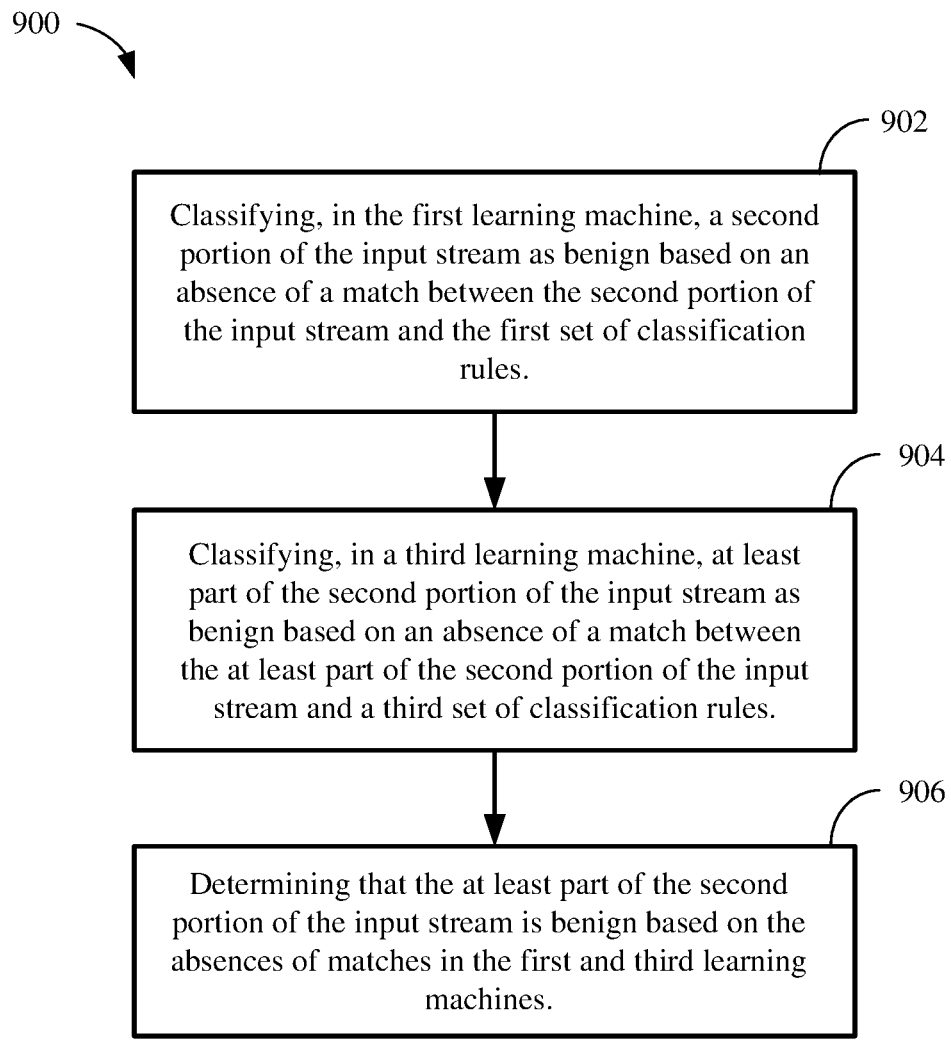
FIG. 9 shows a flow chart depicting an example operation for detecting a presence benign traffic in a network traffic flow, according to some implementations.

FIG. 9 shows a flow chart depicting another example operation 900 for classifying network traffic as containing benign data by inferring that the classified network traffic is benign due to the absence of detecting malicious traffic. In some implementations, the example operation 900 may be performed after determining that the at least part ($M_1M_{2B}$) of the first portion ($M_1$) of the input stream contains malware in block 808 of FIG. 8. In other implementations, the example operation 900 may be performed concurrently with one or more of the processes performed in respective blocks 804, 806, and 808 of FIG. 8. Referring also to FIG. 5B, the operation 900 may begin at block 902 with classifying, in the first learning machine 510, a second portion ($B_1$) of the input stream as benign based on an absence of a match between the second portion ($B_1$) of the input stream and the classification rules MS1. The operation 900 proceeds at block 904 with classifying, in the third learning machine 520B, at least part ($B_1B_{2B}$) of the second portion ($B_1$) of the input stream as benign based on an absence of a match between the at least part of the second portion of the input stream and the classification rules MS3. The operation 900 proceeds at block 906 with determining that the at least part ($B_1B_{2B}$) of the second portion ($B_1$) of the input stream is benign based on the absence of matches with the different sets of classification rules in both the first learning machine 510 and the third learning machine 520B. In some implementations, determining that the at least part ($B_1B_{2B}$) of the second portion ($B_1$) of the input stream is benign in block 906 may be based on the number of learning machines classifying that data portion as benign being greater than the number of learning machines classifying that data portion as malicious (e.g., such that a majority of the learning machines that processed the at least part of the second portion of the input stream determined that portion of the input stream to be benign, or at least to not contain malware).

Figure 10:
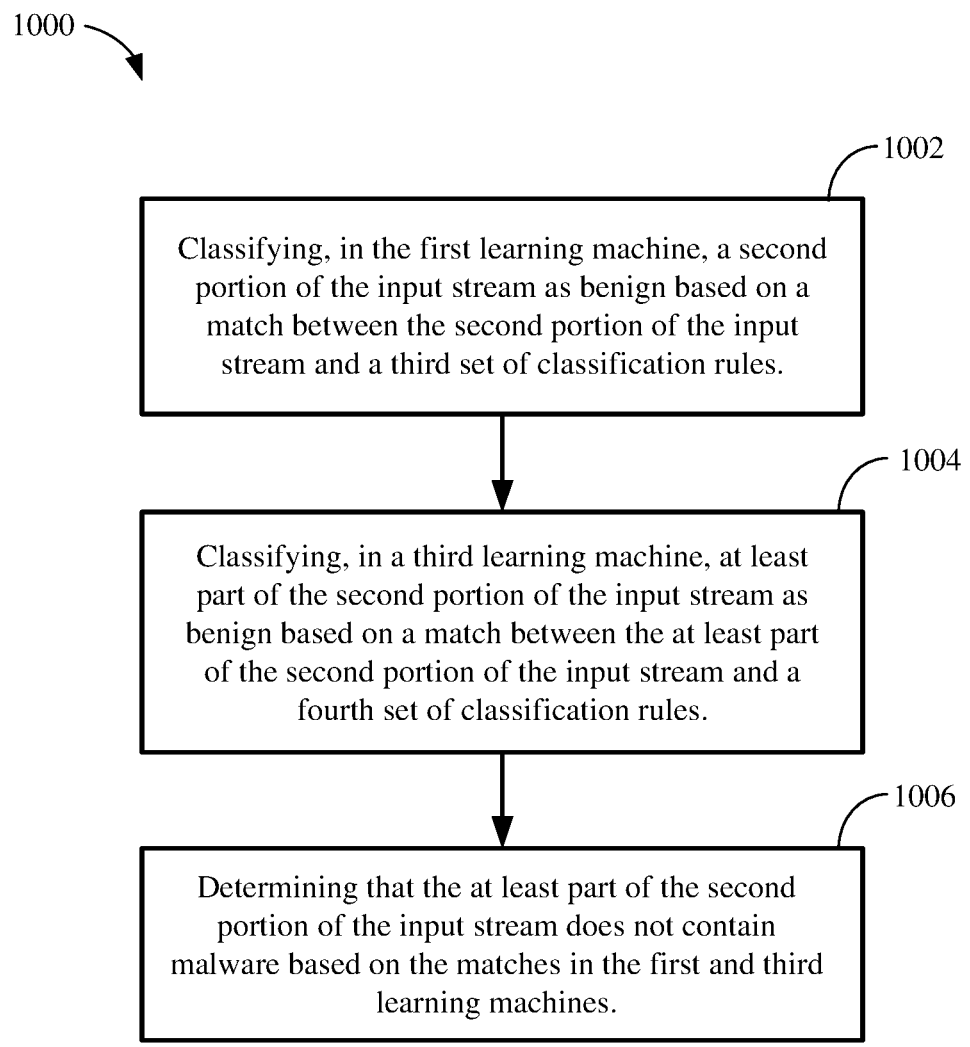
FIG. 10 shows a flow chart depicting another example operation for detecting a presence benign traffic in a network traffic flow, according to some implementations.

FIG. 10 shows a flow chart depicting another example operation 1000 for classifying network traffic as containing benign data using the benign classification rules BS1 and BS3. In some implementations, the example operation 1000 may be performed after determining that the at least part of the first portion of the input stream contains malware in block 808 of FIG. 8. In other implementations, the example operation 1000 may be performed after classifying the first portion of the input stream as malicious in the first learning machine 510. Referring also to FIG. 5B, the operation 1000 begins at block 1002 with classifying, in the first learning machine, a second portion ($B_1$) of the input stream as benign based on a match between the second portion ($B_1$) of the input stream and a third set of classification rules (e.g., the classification rules BS1). The operation 1000 proceeds at block 1004 with classifying, in a third learning machine 520B, at least part ($B_1B_{2B}$) of the second portion of the input stream as benign based on a match between the at least part ($B_1B_{2B}$) of the second portion ($B_1$) of the input stream and a fourth set of classification rules (e.g., the classification rules BS3). The operation 1000 proceeds at block 1006 with determining that the at least part of the second portion of the input stream does not contain malware based on the matches in both the first learning machine 510 and the third learning machine 520B. In some implementations, determining that the at least part ($B_1B_{2B}$) of the second portion ($B_1$) of the input stream does not contain malware in block 1006 may be based on the first learning machine 510 and the third learning machine 520B independently classifying other portions of the input stream as malicious.

Figure 11:
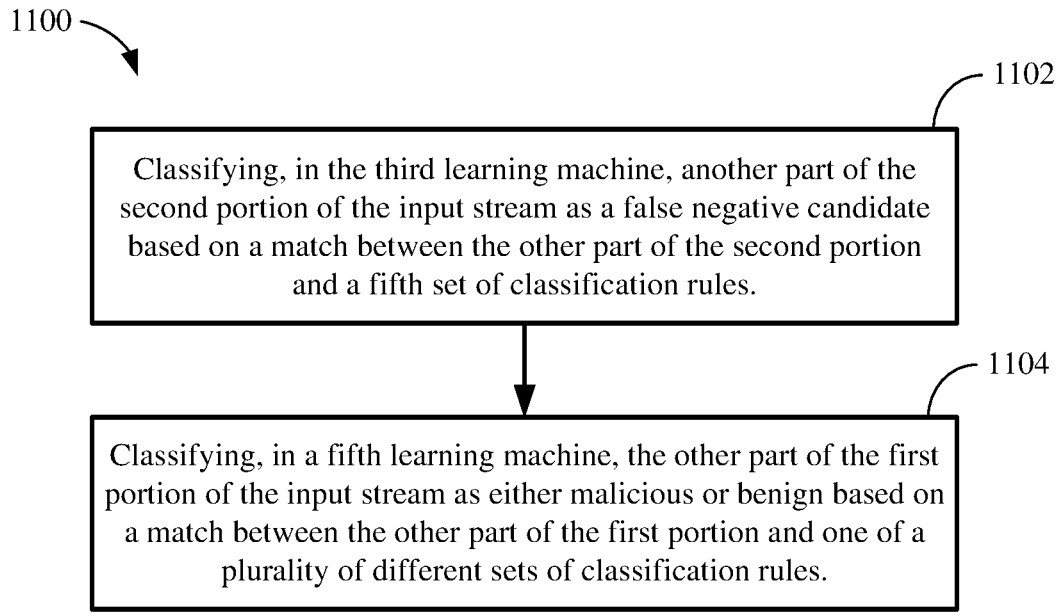
FIG. 11 shows a flow chart depicting an example operation for detecting false negative candidates and classifying one or more portions of a network traffic flow, according to some implementations.

FIG. 11 shows a flow chart depicting another example operation 1100 for detecting false negative candidates and classifying one or more portions of a network traffic flows. In some implementations, the example operation 1100 may be performed concurrently with one or more of the processes of the example operation 800 of FIG. 8, the example operation 900 of FIG. 9, and/or the example operation 1000 of FIG. 10.

Referring also to FIG. 5B, the example operation 1100 may begin in block 1102 with classifying, in the third learning machine 520B, another part ($B_1M_{2B}$) of the second portion ($B_1$) of the input stream as a false negative candidate based on a match between the other part ($B_1M_{2B}$) of the second portion ($B_1$) of the input stream and a fifth set of classification rules (e.g., the classification rules MS3). The operation 1100 proceeds at block 1104 with classifying, in a fifth learning machine 530B, the other part ($B_1M_{2B}$) of the second portion ($B_1$) of the input stream as either malicious or benign based on a match between the other part ($B_1M_{2B}$) of the second portion ($B_1$) of the input stream and one of a plurality of different sets of classification rules. In some implementations, the fifth learning machine 530B may classify the other part ($B_1M_{2B}$) of the second portion ($B_1$) of the input stream as malicious based on a match between the other part ($B_1M_{2B}$) of the second portion ($B_1$) of the input stream and the classification rules MS5, or as benign based on a match between the other part ($B_1M_{2B}$) of the second portion ($B_1$) of the input stream and the classification rules BS5. In one or more implementations, the fifth learning machine 530B may be configured to detect false negative candidates. In addition, or in the alternative, the fifth learning machine 530B may be configured to remove false negative candidates by classifying the false negative candidates as either malicious or benign based at least in part on the classification rules MS5 and BS5.

Figure 12:
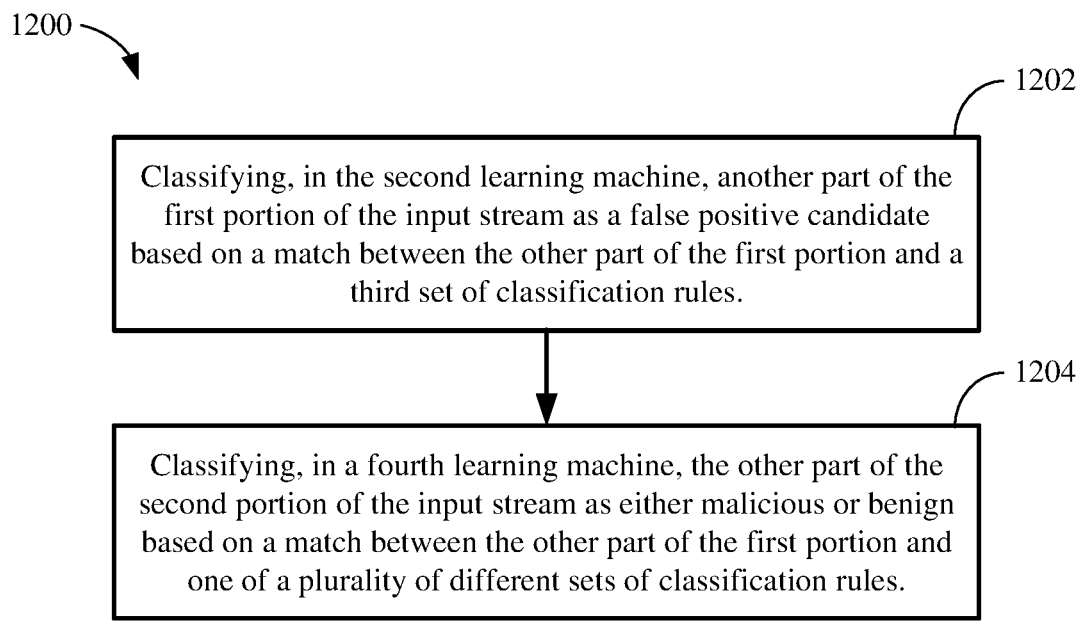
FIG. 12 shows a flow chart depicting an example operation for detecting false positive candidates and classifying one or more portions of a network traffic flow, according to some implementations.

FIG. 12 shows a flow chart depicting an example operation 1200 for detecting false positive candidates and classifying one or more portions of a network traffic flow. In some implementations, the example operation 1200 may be performed concurrently with one or more of the processes of the example operation 800 of FIG. 8, the example operation 900 of FIG. 9, the example operation 1000 of FIG. 10, and/or the example operation 1100 of FIG. 11.

Referring also to FIG. 5B, the example operation 1200 may begin in block 1202 with classifying, in the second learning machine 520A, another part ($M_1B_{2A}$) of the first portion ($M_1$) of the input stream as a false positive candidate based on a match between the other part ($M_1B_{2A}$) of the first portion ($M_1$) of the input stream and a third set of classification rules (e.g., the classification rules MS2). The operation 1200 proceeds at block 1204 with classifying, in the fourth learning machine 530A, the other part ($M_1B_{2A}$) of the first portion ($M_1$) of the input stream as either malicious or benign based on a match between the other part ($M_1B_{2A}$) of the first portion ($M_1$) of the input stream and one of a plurality of different sets of classification rules. In some implementations, the fourth learning machine 530A may classify the other part ($M_1B_{2A}$) of the first portion ($M_1$) of the input stream as either malicious based on a match between the other part ($M_1B_{2A}$) of the first portion ($M_1$) and the classification rules MS4, or as benign based on a match between the other part ($M_1B_{2A}$) of the first portion ($M_1$) and the classification rules BS4. In some implementations, the fourth learning machine 530A may be configured to detect false positive candidates. In addition, or in the alternative, the fourth learning machine 530A may be configured to remove false positive candidates by classifying the false positive candidates as either malicious or benign based at least in part on the classification rules MS4 and BS4.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A malware detection system, comprising:
an input terminal coupled to an input stream;
an output terminal configured to provide results indicative of whether the input stream contains malware;
a plurality of learning machines, each learning machine including a control input to receive a corresponding set of classification rules, including a data input to receive one or more portions of the input stream, and configured to classify the one or more respective portions of the input stream as malicious or benign based on a comparison between the one or more respective portions of the input stream and the corresponding set of classification rules; and
a programmable flow switch including an input coupled to the input terminal, a plurality of bi-directional ports coupled to the plurality of respective learning machines, and one or more outputs selectively coupled to the output terminal, the programmable flow switch configured to selectively interconnect the plurality of learning machines into one of a multitude of unique configurations based at least in part on configuration data.

2. The malware detection system of claim 1, wherein each set of classification rules is unique.

3. The malware detection system of claim 1, wherein each set of classification rules includes first rules for detecting malicious traffic and second rules for detecting benign traffic.

4. The malware detection system of claim 1, wherein each of the multitude of unique configurations causes the programmable flow switch to arrange the plurality of learning machines in at least two hierarchical levels.

5. The malware detection system of claim 4, wherein the sets of classification rules corresponding to learning machines arranged in the same hierarchical level are the same as each other, and the sets of classification rules corresponding to learning machines arranged in different hierarchical levels are different from one another.

6. The malware detection system of claim 5, wherein at least one of the multitude of unique configurations causes the programmable flow switch to route an entirety of the input stream to a first learning machine arranged in a first hierarchical level, to route first portions of the input stream classified as malicious by the first learning machine to a second learning machine arranged in a second hierarchical level based on a match between the first portions of the input stream and a first set of classification rules, and to route second portions of the input stream classified as benign by the first learning machine to a third learning machine arranged in the second hierarchical level based on a match between the second portions of the input stream and a second set of classification rules.

7. The malware detection system of claim 6, wherein the at least one unique configuration causes the programmable flow switch to route only portions of the input stream classified as malicious by the second learning machine to the output terminal and to route only portions of the input stream classified as benign by the second learning machine to a fourth learning machine arranged in a third hierarchical level.

8. The malware detection system of claim 7, wherein the at least one unique configuration causes the programmable flow switch to route only portions of the input stream classified as benign by the third learning machine to the output terminal and to route only portions of the input stream classified as malicious by the third learning machine to a fifth learning machine arranged in the third hierarchical level.

9. The malware detection system of claim 4, wherein at least one of the multitude of unique configurations causes the programmable flow switch to route results generated by each learning machine arranged in a respective hierarchical level to one or more other learning machines arranged in the same respective hierarchical level.

10. The malware detection system of claim 4, wherein at least one of the multitude of unique configurations causes the programmable flow switch to route results generated by a first learning machine arranged in a respective hierarchical level to other learning machines arranged in one or more other hierarchical levels that are non-adjacent to the respective hierarchical level.

11. The malware detection system of claim 10, wherein the programmable flow switch selectively routes the results generated by the first learning machine to the other learning machines arranged in the one or more other non-adjacent hierarchical levels based on one or more patterns recognized in the input stream.

12. The malware detection system of claim 1, wherein at least one of the multitude of unique configurations causes the programmable flow switch to dynamically remove one or more of the plurality of learning machines from the at least one unique configuration.

13. The malware detection system of claim 1, wherein at least one of the multitude of unique configurations causes the programmable flow switch to dynamically insert one or more additional learning machines into the at least one unique configuration.

14. The malware detection system of claim 1, wherein at least one of the multitude of unique configurations causes the programmable flow switch to remove one or more signal interconnections between the plurality of learning machines based on the classifications provided by one or more of the learning machines.

15. The malware detection system of claim 1, wherein at least one of the multitude of unique configurations causes the programmable flow switch to dynamically route the input stream through the plurality of learning machines based on one or more characteristics of the input stream.

16. The malware detection system of claim 15, wherein the one or more characteristics include at least one of a nature of the input stream, a type or class of traffic associated with the input stream, a source address of the input stream, or a destination addresses of the input stream.

17. The malware detection system of claim 1, wherein the selective interconnection of the learning machines is further based on the classifications provided by at least some of the plurality of learning machines.

18. The malware detection system of claim 1, wherein the programmable flow switch is configured to dynamically change the selective interconnection of the plurality of learning machines based on the classifications provided by at least some of the plurality of learning machines.

19. The malware detection system of claim 1, further comprising a results memory to store the classifications provided by at least some of the plurality of learning machines.

20. The malware detection system of claim 19, wherein the results memory stores tags generated by each of the plurality of learning machines, each tag identifying portions of the input stream classified by the corresponding learning machine as malicious, portions of the input stream classified by the corresponding learning machine as benign, or both.

21. A method performed by a system including a plurality of learning machines, the method comprising:
receiving an input stream;
selectively interconnecting the plurality of learning machines into one of a multitude of unique configurations based at least in part on configuration data;
classifying, in each of the plurality of learning machines, one or more respective portions of the input stream as malicious or benign based on a comparison between the one or more respective portions of the input stream and a corresponding set of classification rules; and
providing results indicative of whether the input stream contains malware based on the classifications associated with at least some of the plurality of learning machines.

22. The method of claim 21, further comprising:
arranging the plurality of learning machines in at least two hierarchical levels.

23. The method of claim 22, further comprising:
routing an entirety of the input stream to a first learning machine in a first hierarchical level;
routing first portions of the input stream classified as malicious by the first learning machine to a second learning machine arranged in a second hierarchical level based on a match between the first portions of the input stream and a first set of classification rules; and
routing second portions of the input stream classified as benign by the first learning machine to a third learning machine arranged in the second hierarchical level based on a match between the second portions of the input stream and a second set of classification rules.

24. The method of claim 23, further comprising:
routing only portions of the input stream classified as benign by the second learning machine to a fourth learning machine arranged in a third hierarchical level; and
preventing an output of portions of the input stream classified as malicious by the second learning machine.

25. The method of claim 24, further comprising:
routing only portions of the input stream classified as malicious by the third learning machine to a fifth learning machine arranged in the third hierarchical level; and
outputting only portions of the input stream classified as benign by the third learning machine.

26. The method of claim 22, further comprising:
routing results generated by each learning machine arranged in a respective hierarchical level to one or more other learning machines arranged in the same respective hierarchical level.

27. The method of claim 21, further comprising:
dynamically removing one or more of the plurality of learning machines from the at least one unique configuration.

28. The method of claim 21, further comprising:
dynamically inserting one or more additional learning machines into the at least one unique configuration.

29. The method of claim 21, further comprising:
removing one or more signal interconnections between the plurality of learning machines based on the classifications associated with one or more of the learning machines.

30. The method of claim 21, further comprising:
dynamically changing the selective interconnection of the plurality of learning machines based on the classifications associated with at least some of the learning machines.

* * * * *